(12) United States Patent
Morikawa et al.

(10) Patent No.: US 8,123,513 B2
(45) Date of Patent: Feb. 28, 2012

(54) APPARATUS FOR ROLLING FOOD DOUGH

(75) Inventors: Michio Morikawa, Utsunomiya (JP);
Torahiko Hayashi, Utsunomiya (JP);
Takamasa Tsuchida, Utsunomiya (JP);
Hiroshi Ebata, Utsunomiya (JP); Norio Koboyashi, Utsunomiya (JP)

(73) Assignee: Rheon Automatic Machinery Co., Ltd., Tochigi (JP)

( * ) Notice: Subject to any disclaimer, the term of this patent is extended or adjusted under 35 U.S.C. 154(b) by 673 days.

(21) Appl. No.: 11/577,170

(22) PCT Filed: Jun. 1, 2006

(86) PCT No.: PCT/JP2006/310996
§ 371 (c)(1),
(2), (4) Date: Feb. 26, 2009

(87) PCT Pub. No.: WO2006/129759
PCT Pub. Date: Dec. 7, 2006

(65) Prior Publication Data
US 2009/0162512 A1  Jun. 25, 2009

(30) Foreign Application Priority Data

Jun. 3, 2005 (JP) ............................. 2005-163837
Jul. 20, 2005 (JP) ............................. 2005-210490
Jul. 21, 2005 (JP) ............................. 2005-211278
Dec. 27, 2005 (JP) ............................. 2005-376011

(51) Int. Cl.
*A21C 3/02* (2006.01)

(52) U.S. Cl. ............... 425/366; 425/356; 425/374
(58) Field of Classification Search ............ 425/356, 425/366, 374, 394
See application file for complete search history.

(56) References Cited

U.S. PATENT DOCUMENTS 1,628,828 A * 5/1927 Denmead ..................... 425/265
(Continued)

FOREIGN PATENT DOCUMENTS
EP  1129621  5/2001
(Continued)

*Primary Examiner* — James Mackey
(74) *Attorney, Agent, or Firm* — Myers Andras Sherman & Zarrabian LLP; Joseph C. Andras

(57) ABSTRACT

These inventions provide a method and an apparatus for rolling food dough without causing slipping between the food dough and rolling rollers and without causing twisted shrinkages in the food dough, and disk-shaped food dough manufactured by the method. Further, these inventions relate to the disk-shaped food dough manufactured by the method and the apparatus. The apparatus used for the method is comprised of a cradle that can relatively ascend away from and descend toward a table, and conical-shaped rolling rollers rotatably disposed at the cradle, which rollers can swivel. When the food dough is rolled by means of the rolling rollers by pressing the food dough, the rolling rollers rotate so that the speed of the rotation is higher than that when they are passively rotated by the swiveling motion. The relative speed of the descent of the rolling rollers toward the food dough is controlled so that the speed gradually decreases from the initial speed.

27 Claims, 22 Drawing Sheets

U.S. PATENT DOCUMENTS

| | | | |
|---|---|---|---|
| 4,857,349 A * | 8/1989 | Finlay | 425/366 |
| 5,204,125 A * | 4/1993 | Larsen | 425/394 |
| 7,547,206 B2 * | 6/2009 | Kobayashi et al. | 425/356 |

FOREIGN PATENT DOCUMENTS

| | | |
|---|---|---|
| JP | 5832847 | 7/1983 |
| JP | 6044885 | 5/1985 |
| JP | 6045892 | 10/1985 |
| JP | 1252266 | 10/1989 |
| JP | 2079929 | 3/1990 |
| JP | 445134 | 7/1992 |
| JP | 4293477 | 10/1992 |
| JP | 1132660 | 2/1999 |
| JP | 2005333803 | 12/2005 |
| JP | 3811790 | 6/2006 |
| WO | 8601078 | 2/1986 |

* cited by examiner

Fig. 8
(a) 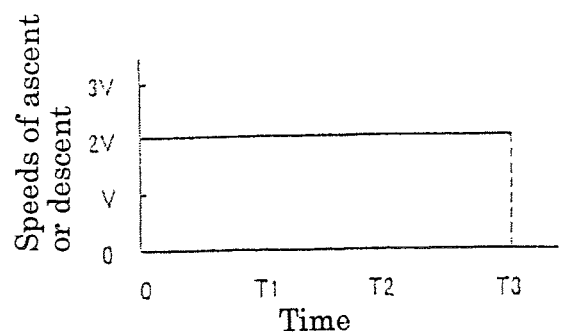
(b) 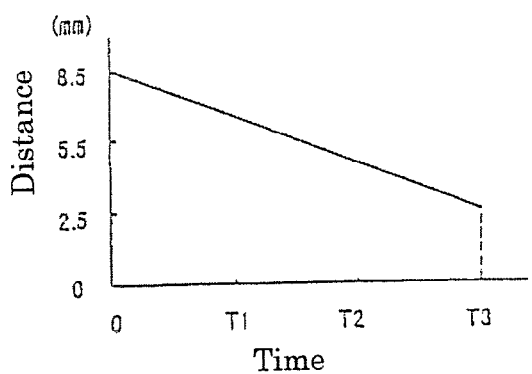
(c) 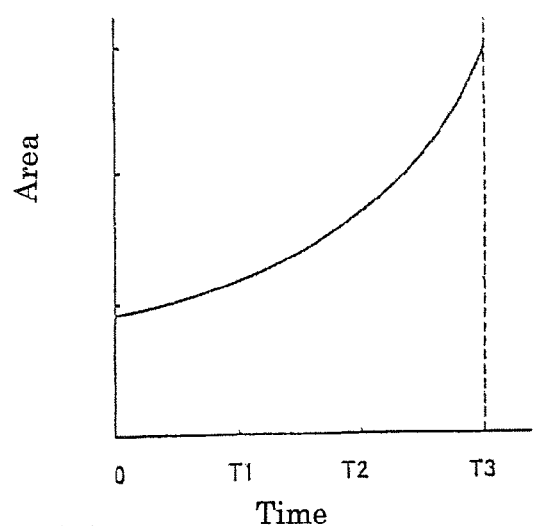
(d) 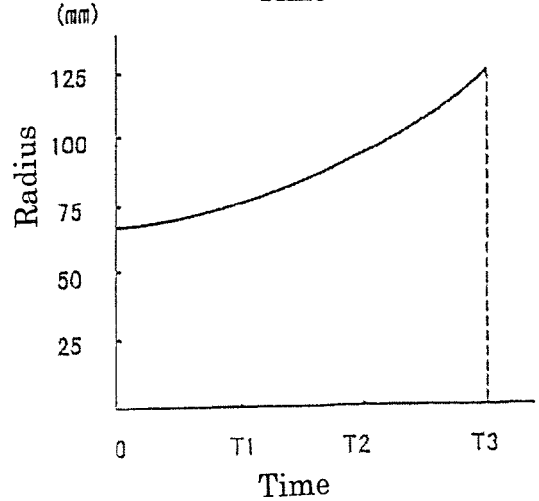

Fig. 14
(a) 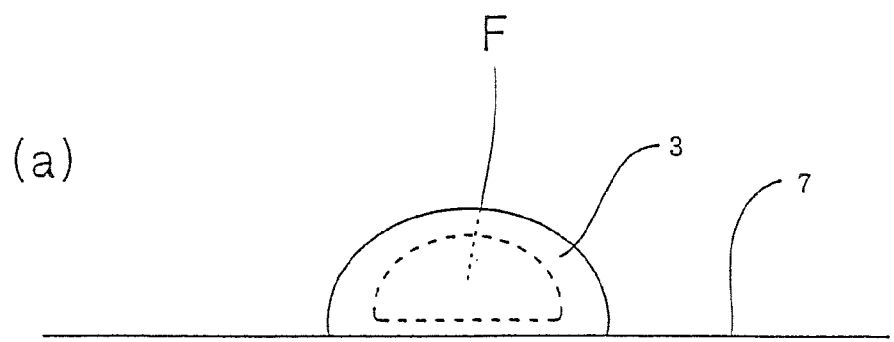
(b) 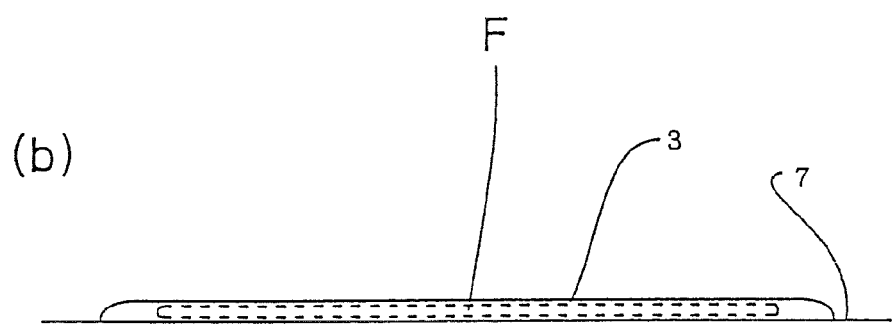
(c) 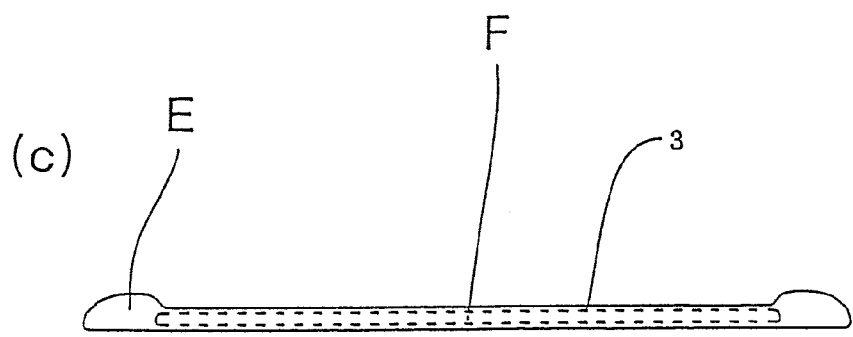

Fig. 21
(A)
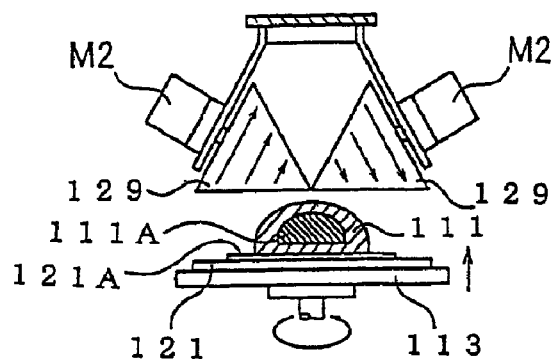
(B)
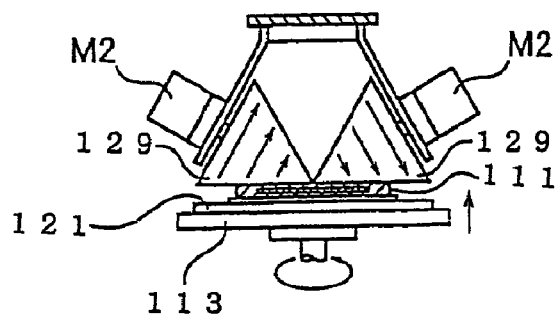
(C)
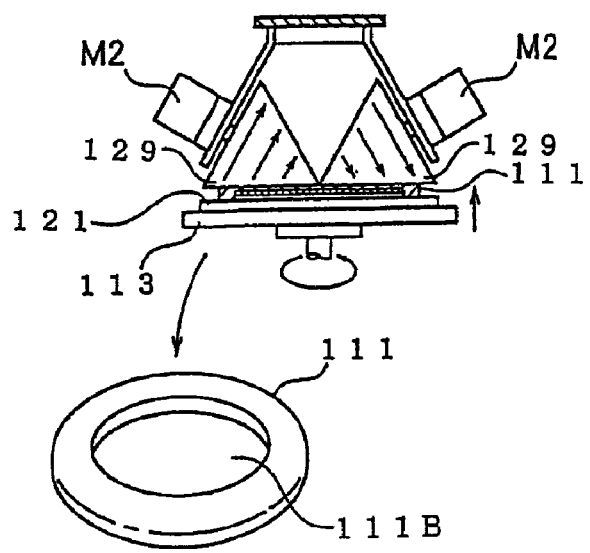

APPARATUS FOR ROLLING FOOD DOUGH

FIELD OF THE INVENTION

These inventions relate to a method and an apparatus for rolling food dough so that disk-shaped food dough can be formed from a block of it. For example, there are dough for a pizza crusting cheese, dough for bread, dough for a pizza having fillings, and dough for bread having fillings, as a block of food dough. More particularly, according to this method and apparatus, disk-shaped food dough having a uniform thickness can be formed from a block of it without causing slipping between the food dough and rolling rollers and without causing twisted shrinkages in the food dough. Further, these inventions relate to the disk-shaped food dough manufactured by the method and the apparatus.

BACKGROUND OF THE INVENTION

Generally, when dough for pie, dough for pizza, or dough for bread having a flattened shape is manufactured, the following method is used. First, a block of food dough having an appropriate shape, such as roughly spherical, a rectangular solid, or a thick and disk-like shape, is prepared. Then, the block of food dough is rolled, and the food dough having a flattened shape, such as a disc-like, ellipse, or roughly tetragonal shape, is manufactured. (See Patent Documents 1, 2, and 3.)

There is an apparatus for forming disk-shaped food dough, comprising, a device for manufacturing a base material made from kneaded flour, wherein the device has a conveyer belt, a die for cutting the periphery of the base material to form a predetermined shape by means of the reciprocating and vertical movement of the die, wherein the die is disposed above the conveyer belt, a circular plate disposed below the conveyer belt, and a plurality of small rollers disposed on the circular plate so that the plurality of the small rollers form at least one convolution, wherein the small rollers press the lower surface of the conveyer belt when the die descends toward the conveyer belt. (See Patent Document 4.)

There are several types of food dough containing fillings in it, such as bread dough containing layers of cream cheese as oil-based layers, and a pizza crust containing oil-based sauce. These food-dough-containing-fillings are manufactured by means of the following method. First, a block of food dough encrusting an oil-based material, like a bun with a bean-jam filling, is manufactured. Next, the block of the food dough is rolled by a rolling apparatus having a pair of rollers vertically disposed in it so that a substantially elliptical crust can be made. Then, the substantially elliptical crust is rotated by 90 degrees and is again rolled by the rolling apparatus so that the substantially circular crust can be made. (See Patent Document 5.)

Patent Document 1: Japanese Patent Gazette No. S32-3040
Patent Document 2: Japanese Patent Gazette No. S58-32847
Patent Document 3: Japanese Patent Laid-open Publication No. S57-129634
Patent Document 4: Japanese Patent Laid-open Publication No. H4-293447
Patent Document 5: Japanese Patent Laid-open Publication No. H11-32660

DISCLOSURES OF THE INVENTIONS

Patent Document 1 discloses an apparatus comprising:
a table for placing food dough on it,
a member for supporting rolling rollers disposed above the table, wherein the member can move vertically and rotate around the vertical axis of the center of the member in the horizontal plane, and
conical-shaped rolling rollers rotatably disposed at the member for supporting rollers for rolling the food dough.

Patent Document 2 discloses an apparatus comprising:
a table for placing food dough on it, wherein the table is rotatable in the horizontal plane,
a member for supporting rolling rollers disposed above the table, wherein the member can move vertically, and
conical-shaped rolling rollers rotatably disposed at the member for supporting rollers for rolling the food dough.

For the inventions disclosed in Patent Documents 1 and 2, the rolling rollers relatively ascend away from and descend toward the food dough placed on the table, and press it. Further, the rolling rollers can swivel about the vertical axis of the member for supporting them and can passively rotate by means of the swiveling motion. The food dough is rolled by the rolling rollers that move as explained above. In these inventions, a distinguishable technical feature is that the rolling rollers passively rotate by means of the swiveling motion of the member for supporting them. Consequently, the food dough processed by the apparatus may be damaged, since slipping may be caused between the surfaces of the rolling rollers and the food dough. Further, ribbed-like embossments may be caused at the front of the rolling rollers. Since the embossments move forward along with the rolling rollers, it takes a long time to roll food dough so that it has a uniform thickness. In addition, when food dough is tougher, it may be harder to roll food dough so that is has a uniform thickness.

For the invention disclosed in Patent Document 3, there are the same problems.

For the invention disclosed in Patent Document 4, since food dough is rolled by rolling rollers along a conveyer belt, the step for rolling food dough is not effective.

For the invention disclosed in Patent Document 5, since it is required that the direction for rolling food dough be changed at least twice, the step for rolling food dough is also not effective. Further, it is difficult to make food dough having a circular shape.

Further, for the invention disclosed in Patent Documents 1 and 2, it is required to feed food dough to the table, and also to remove the food dough having a disk-like shape after rolling it. Thus, there is a problem in that the efficiency of the step for manufacturing such food dough is not high.

These inventions intend to solve the problems. In the first aspect of these inventions, it relates to a method for rolling food dough on the table by means of rolling rollers swiveling above the table. Especially, for these inventions, the rolling rollers rotate so that they rotate at a speed higher than that when they are passively rotated by their swiveling motion.

Further, these inventions relate to an apparatus for rolling the food dough on the table by means of the rolling rollers swiveling above the table. The apparatus is comprised of a first motor used as a first driving means for swiveling the rolling rollers and a second motor used as a second driving means for rotating them. The apparatus is also provided with a control means for controlling those motors to rotate the rolling rollers so that they rotate at a speed higher than that when they are passively rotated by the swiveling motion.

Further, these inventions relate to a method for rolling the food dough on the table so that disk-shaped food dough can be formed from a block of it. The apparatus used for the method is comprised of a cradle that can relatively ascend away from and descend toward the table, and conical-shaped rolling rollers rotatably disposed at the cradle, which rollers can swivel about the axis of the center of the cradle. Especially, for these inventions, when the food dough is rolled by means of the rolling rollers by pressing the food dough, the rolling rollers rotate so that they rotate at a speed higher than that when they are passively rotated by the swiveling motion.

For the method for rolling the food dough of these inventions, the relative speed of the descent of the rolling rollers for the food dough is controlled so that the speed gradually decreases from the initial speed, at a predetermined rate.

For the method for rolling the food dough of these inventions, the relative speed of the descent of the rolling rollers toward the food dough is controlled so that for an initial certain time, or for the time necessary to achieve food dough having a predetermined thickness, the speed is maintained at a constant value, and then the speed gradually decreases from the initial speed, at a predetermined rate.

For the method for rolling the food dough of these inventions, the relative speed of the descent of the rolling rollers toward the food dough is controlled so that the speed gradually decreases from the initial speed along a curve of the second order or in a stepwise way.

Further, for the apparatus for rolling the food dough on the table so that disk-shaped food dough can be formed from a block of it, the apparatus is comprised of a cradle that can relatively ascend away from and descend toward the table, conical-shaped rolling rollers rotatably disposed at the cradle, which rollers can swivel about the axis of the center of the cradle, and motors to rotate the rolling rollers.

The apparatus for rolling the food dough is further comprised of a plurality of rolling rollers, and respective motors corresponding to the rollers, to rotate them.

The apparatus for rolling the food dough is further comprised of a plurality of rolling rollers and respective motors to rotate them, wherein the number of the motors is less than that of the rolling rollers, and wherein the rolling rollers are connected to the motors through a transmission.

For these inventions, the apparatus for rolling the food dough further comprises a motor to relatively swivel the rolling rollers, and a controlling means to control the rotation of the motor so that the speed of the rotation of the rolling rollers can be maintained at a speed higher than that when they are passively rotated by the swiveling motion.

The apparatus is further comprised of an actuator for relatively lifting the rolling rollers away from the table and lowering them toward the table, and a controlling means to control the driving pattern of the actuator.

For the apparatus for rolling the food dough, the table is further comprised of a conveying means to convey the food dough from the position of the apparatus for rolling it to another position of the apparatus, for removing it.

For the apparatus for rolling the food dough on the table so that disk-shaped food dough can be formed from a block of it, the apparatus is comprised of conical-shaped rolling rollers rotatably disposed above the table, which rollers can swivel about the axis of the center of the table, pinion gears integrated with the rolling rollers, and a ring-shaped guide gear engaging the pinion gears, wherein at least either the table or the rolling rollers can ascend and descend.

For the apparatus for rolling the food dough, the apparatus is further comprised of a motor for relatively swiveling the rolling rollers for the table, wherein the number of teeth of the pinion gears and the guide gears is set so that the speed of the rotation of the rolling rollers, which rotation is caused by an engagement between the pinion gears and the ring-shaped guide gear, can be maintained at a speed higher than that when they are passively rotated by the swiveling motion.

The apparatus is further comprised of an actuator for relatively lifting the rolling rollers away from and lowering them toward the table, and a controlling means to control a driving pattern of the actuator.

For the second aspect of these inventions, they relate to a method for manufacturing disk-shaped food dough, wherein food dough having a substantially spherical shape is rolled so that the food dough has a circular-plate-like shape. The food dough is rolled by means of rolling rollers disposed above the table with a distance between the table and the rollers, wherein the rolling rollers are driven so as to rotate and swivel. By gradually decreasing the distance between the table and the rolling rollers, the apexes of the rolling rollers begin to contact the center of the food dough. When the distance further decreases, the area of the food dough contacting the rolling rollers gradually increases, and then the food dough is pushed in the radial direction from the center of the food dough. Consequently, disk-like food dough can be manufactured.

Further, disk-like food dough containing fillings in it can be manufactured.

Further, the disk-shaped food dough having particles of food adhering to the bottom surface of it can be manufactured by scattering the particles on the table before rolling it.

When the food dough is rolled, the table, which has an outer circumferential and circular area that is slightly lower than the area of the center of the table, can be used for manufacturing food dough having an edge that is slightly higher than the area of the center of the food dough.

Further, these inventions relate to food dough manufactured by this method.

For the third aspect of these inventions, they relate to a method for rolling a block of food dough by an apparatus, wherein the apparatus for rolling food dough is comprised of a table rotating about a vertical axis, and rolling rollers, which are disposed above the table and are rotated about their respective axes.

Especially, for these inventions, the rolling rollers rotate so that they rotate at a speed higher than that when they are passively rotated by the swiveling motion.

Further, for the method for rolling food dough, until the rolling rollers begin to contact the food dough, the table is maintained so that it does not rotate, or rotates at a low speed. After the rolling rollers contact the food dough, the table rotates at a predetermined high speed, and then the food dough is rolled by decreasing the distance between the table and the rolling rollers.

Further, for the method for rolling food dough, at the end of the step for rolling the food dough the rolling rollers are controlled so that they rotate at a low speed.

Further, for the method for rolling food dough, at the end of the step for rolling the food dough, the rotation of the table and the rolling rollers are stopped. Then, at once, the table and the rolling rollers are controlled so that they rotate in the reverse direction.

Further, for the method for rolling food dough, the relative speed of the descent of the rolling rollers for the food dough is controlled so that the speed gradually decreases from the initial speed, at a predetermined rate.

For the method for rolling the food dough, the relative speed of the descent of the rolling rollers for the food dough is controlled so that for an initial certain time, or for the time necessary to achieve food dough having a predetermined thickness, the speed is maintained at a constant value.

Further, for the method for rolling the food dough, the relative speed of the descent of the rolling rollers toward the food dough is controlled so that the speed gradually decreases from the initial speed along a curve of the second order or in a stepwise way.

Further, for the apparatus for rolling the food dough so that disk-shaped food dough can be formed from a block of it, the apparatus is comprised of a table rotated by a motor, wherein the food dough can be placed on the table, and rolling rollers disposed above the table, wherein the table can be rotated by a motor, wherein at least either the table or the rolling rollers can ascend and descend.

The apparatus is further comprised of an actuator for relatively lifting the rolling rollers away from the table and lowering them toward the table, and a controlling means to control the driving pattern of the actuator.

The apparatus is further comprised of a positioning device to position a tray for placing food dough on it.

The apparatus is further comprised of a controller to control the motors for driving the table and the rolling rollers, wherein the controller is comprised of a memory which stores the data of a profile chart for controlling the motors so that the speed of the rolling rollers decreases at the end of the rolling step.

The apparatus is further comprised of an operating means to freely change the direction of the rotation of the table and the rotation of the rolling rollers.

According to the first and third aspects of these inventions, since it is possible to reduce the slipping between the food dough and the rolling rollers and to efficiently roll the food dough, disk-shaped food dough having a uniform thickness can be efficiently formed.

According to the second aspect of these inventions, since the rolling rollers are forced to rotate and swivel, the food dough is uniformly pushed toward the radial direction from the center of it and is rolled so that it has a uniform thickness.

For the method for rolling the food dough, first, the apexes of the rolling rollers begin to contact and press the center of the food dough. Then, the distance between the rolling rollers and the food dough further decreases, the area of the food dough contacting the rolling rollers gradually increases, and then the food dough is pushed away toward the radial direction from the center of the food dough.

Further, the disk-shaped food dough containing fillings in it can be manufactured by rolling a substantially spherical block of food dough, wherein the disk-shaped food dough has a portion having a layer containing the filling at the center of it and an edge made from only the food dough.

When this disk-shaped food dough is baked, since there is a difference in the thermal conduction between the layered portion and the edge of the food dough, it is possible to manufacture products that have a thin and layered portion and an expanded ring-like edge.

The disk-shaped food dough having particles of food adhering for decorations at the bottom surface of it can be rolled by scattering the particles on the table before rolling it. Namely, since the step for rolling and decorating the food dough is simultaneously completed, it is possible to simplify the step.

When the food dough is rolled, if the table which has an outer circumferential and circular area that is slightly lower than the area of the center of it is used for manufacturing the food dough, it is possible to make food dough which has an edge that is slightly higher than the area of the center of the food dough.

According to the second aspect of these inventions, in comparison with the conventional method it is possible to easily manufacture many types of food dough having complex shapes.

BRIEF DESCRIPTIONS OF THE DRAWINGS

FIG. 1 relates to an embodiment according to the first aspect of the apparatus for rolling food dough of the present inventions and shows a conceptual and elevational view of the apparatus.

FIG. 2 relates to an embodiment according to the first aspect of an apparatus for rolling food dough of the present inventions and shows a conceptual and plane view of the apparatus.

FIG. 3 shows steps for rolling the food dough.

FIG. 4 relates to a second embodiment according to the first aspect of the apparatus for rolling food dough of the present inventions and shows a conceptual and elevational view of the apparatus.

FIG. 5 relates to a third embodiment according to the first aspect of the apparatus for rolling food dough of the present inventions and shows a conceptual and elevational view of the apparatus.

FIG. 6 relates to a third embodiment according to the first aspect of the apparatus for rolling food dough of the present inventions and shows an enlarged view of the rolling rollers of the apparatus.

FIG. 8 shows alternative charts indicating the relative speed of the descent of the rolling rollers toward the food dough, the distance between the rolling rollers and the table, the area of the rolled food dough, and the mean radius of the food dough, as a function of time in the rolling step.

Figure 9:
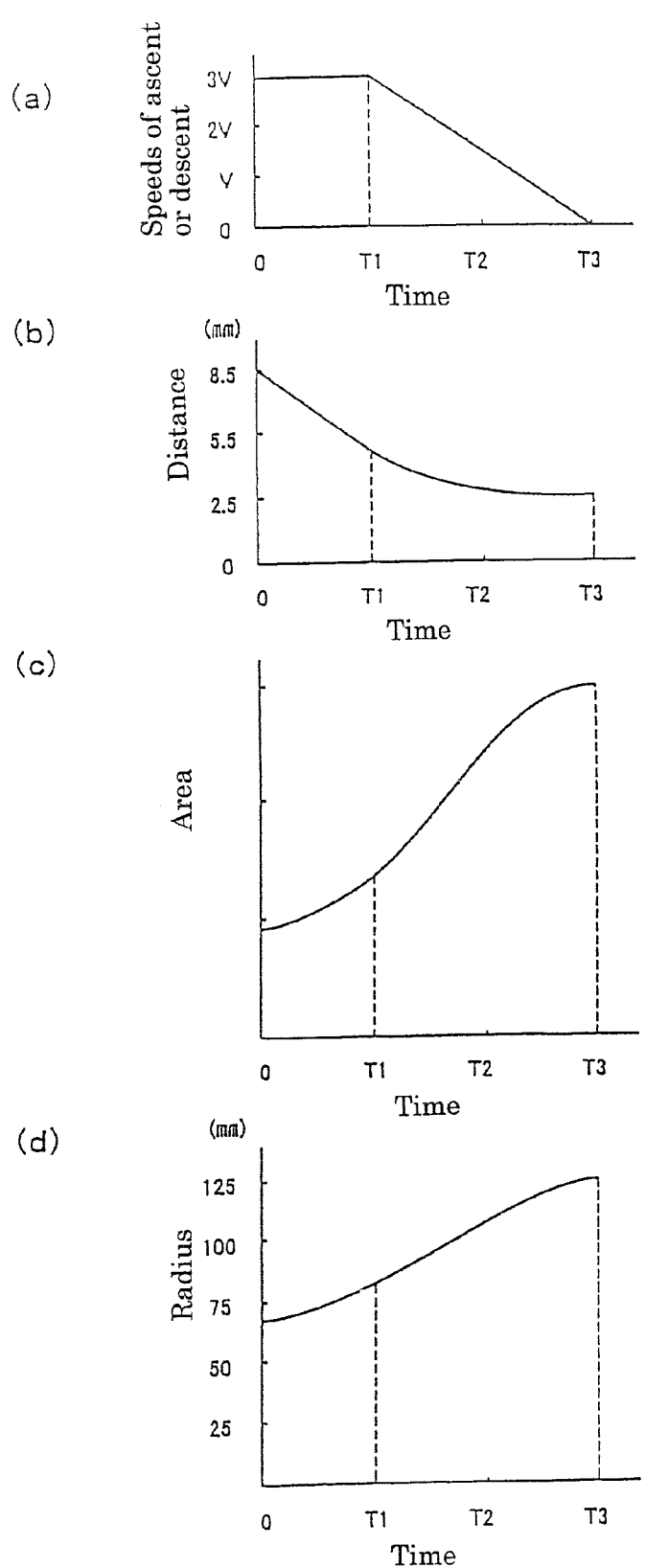

FIG. 9 also shows alternative charts indicating the relative speed of the descent of the rolling rollers toward the food dough, the distance between the rolling rollers and the table, the area of the rolled food dough, and the mean radius of the food dough, as a function of time in the rolling step.

Figure 10:
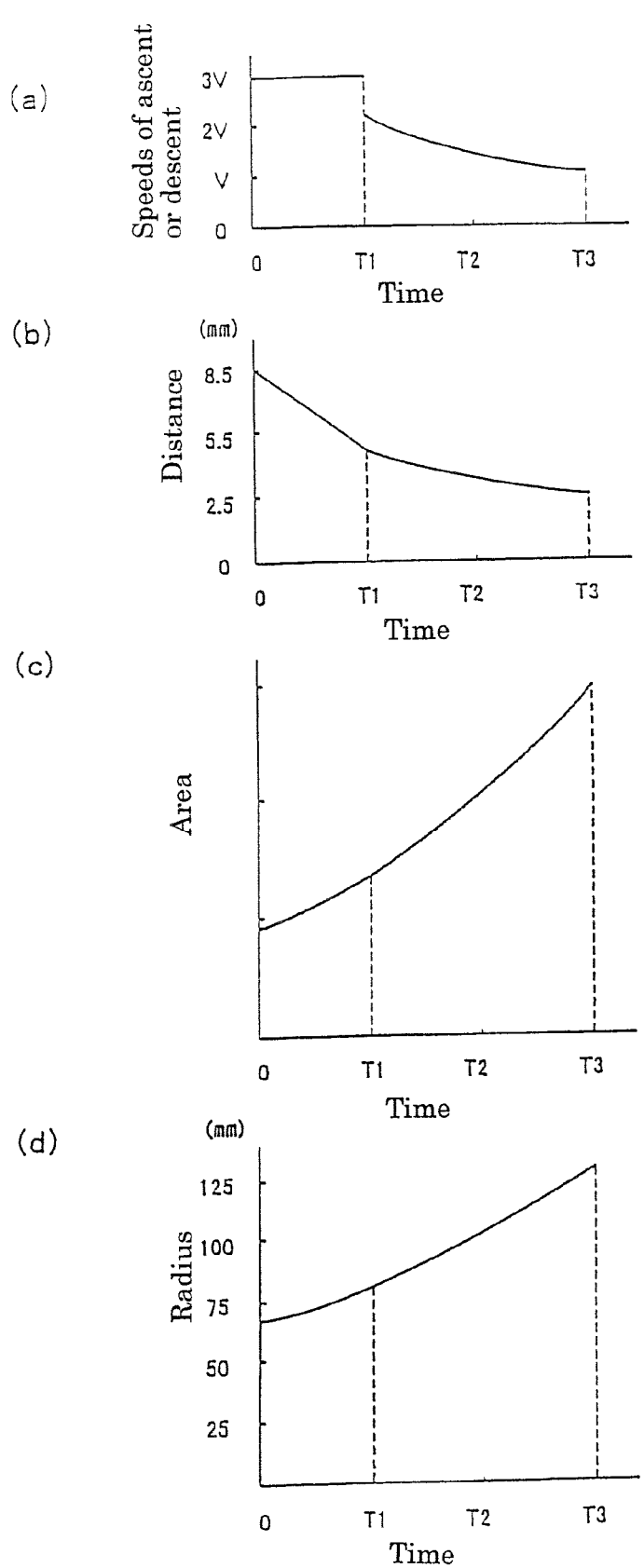

FIG. 10 also shows alternative charts indicating the relative speed of the descent of the rolling rollers toward the food dough, the distance between the rolling rollers and the table, the area of the rolled food dough, and the mean radius of the food dough, as a function of time in the rolling step.

Figure 11:
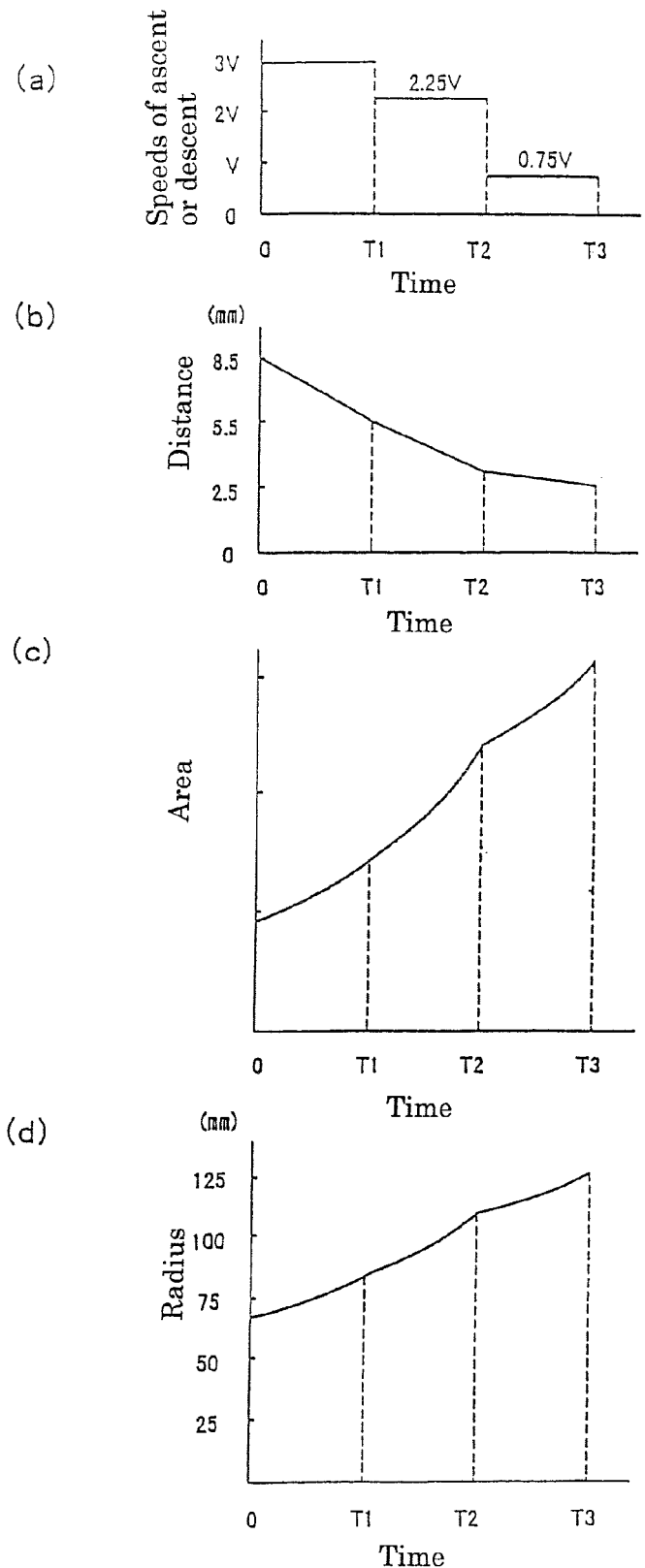

FIG. 11 also shows alternative charts indicating the relative speed of the descent of the rolling rollers toward the food dough, the distance between the rolling rollers and the table, the area of the rolled food dough, and the mean radius of the food dough, as a function of time in the rolling step.

Figure 12:
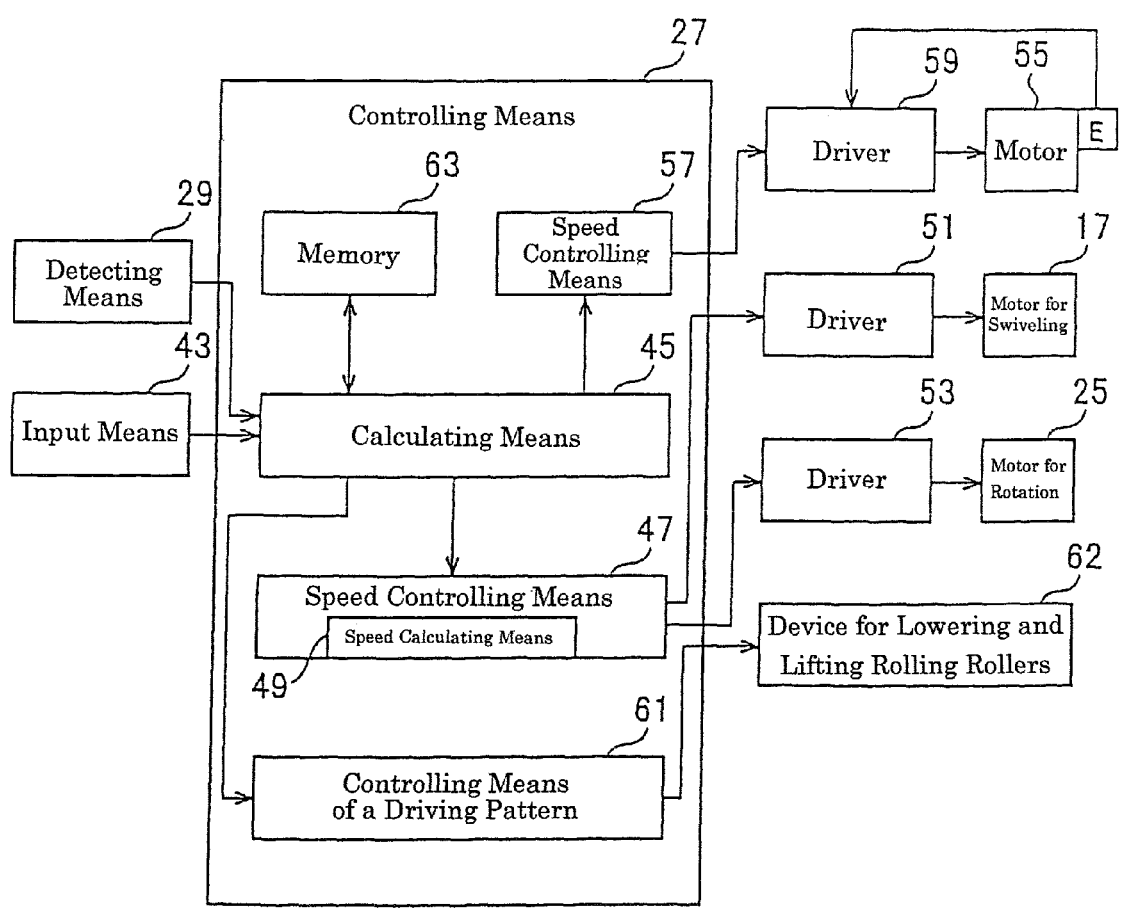

FIG. 12 shows a block diagram indicating the main constitution of the controlling means.

Figure 13:
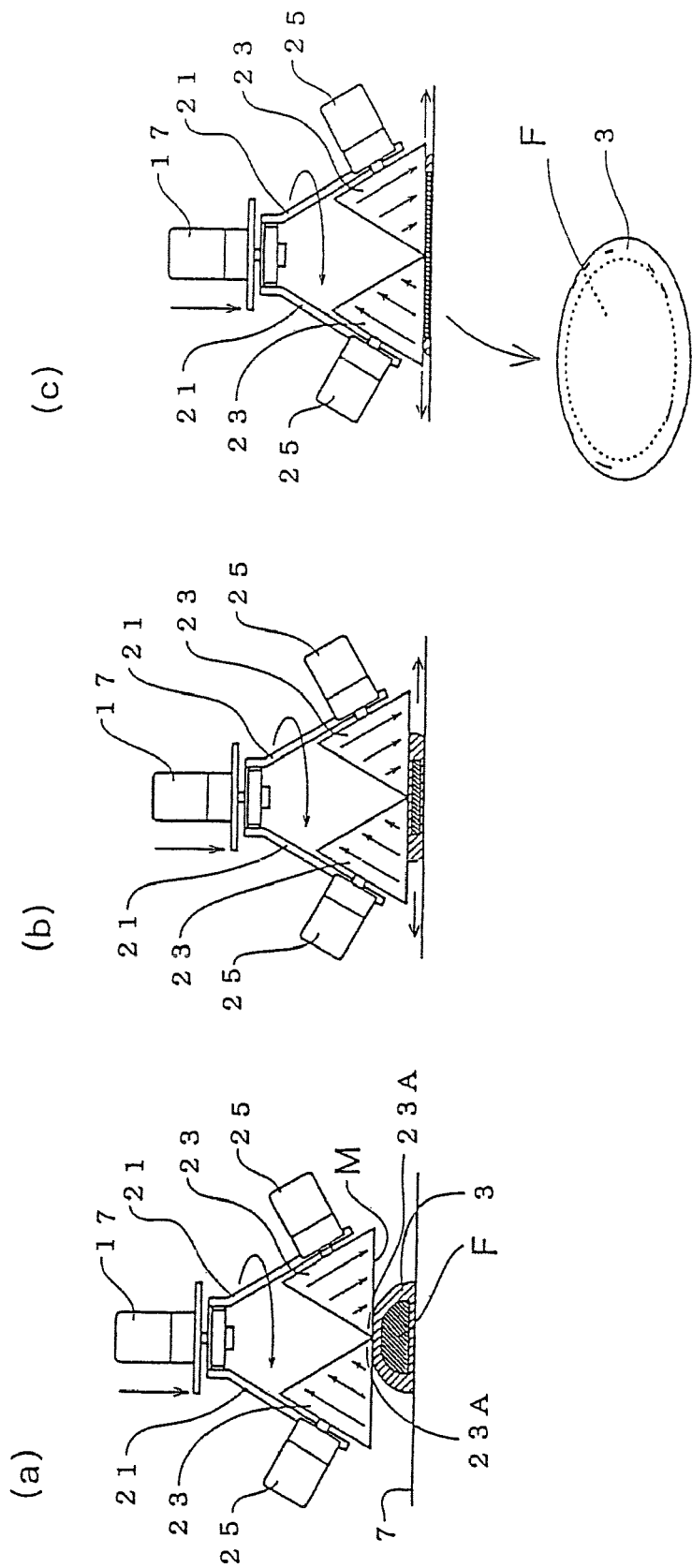

FIG. 13 relates to an embodiment according to the second aspect of the present inventions and shows steps for rolling food dough containing fillings in it.

FIG. 14 shows samples manufactured by the embodiment according to the second aspect of the present inventions.

Figure 15:
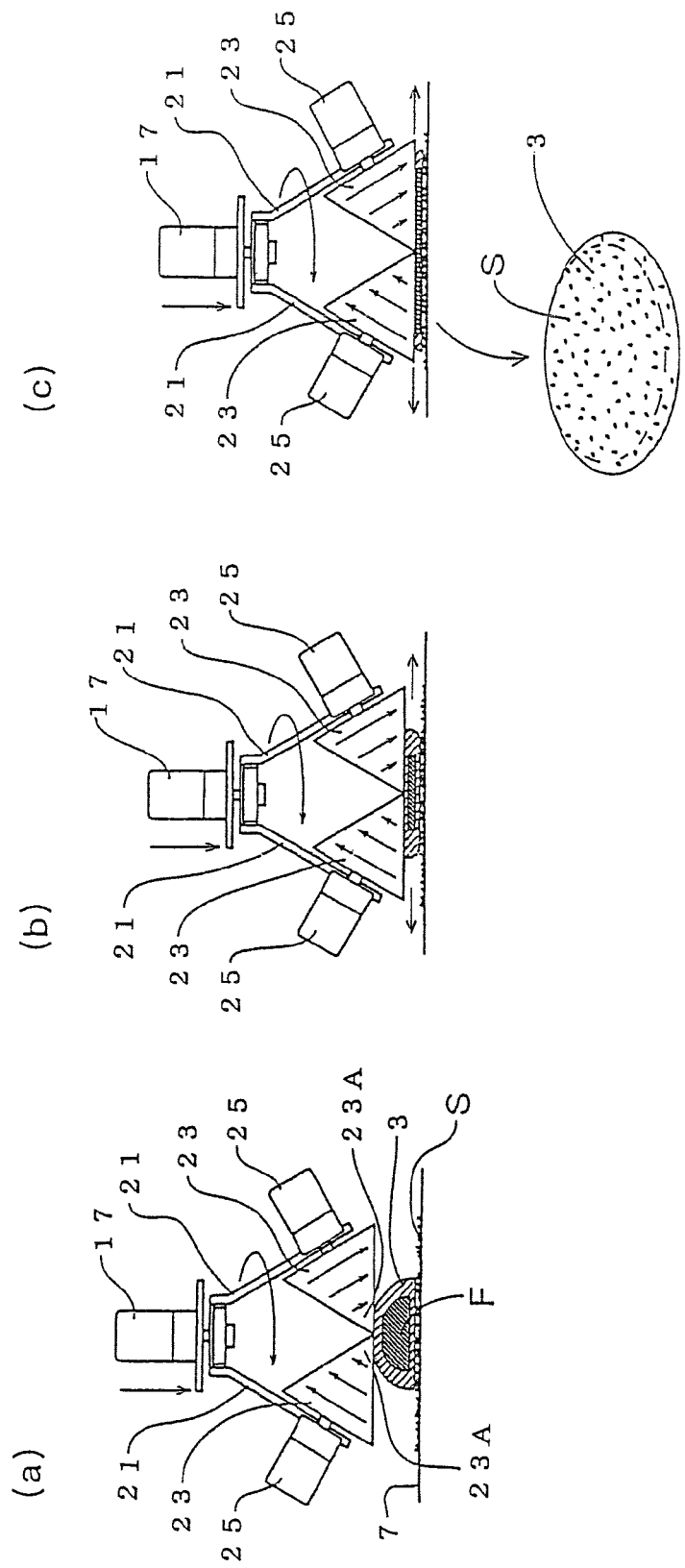

FIG. 15 relates to the embodiment according to the second aspect of the present inventions and shows the steps for rolling food dough with scattered food particles.

Figure 16:
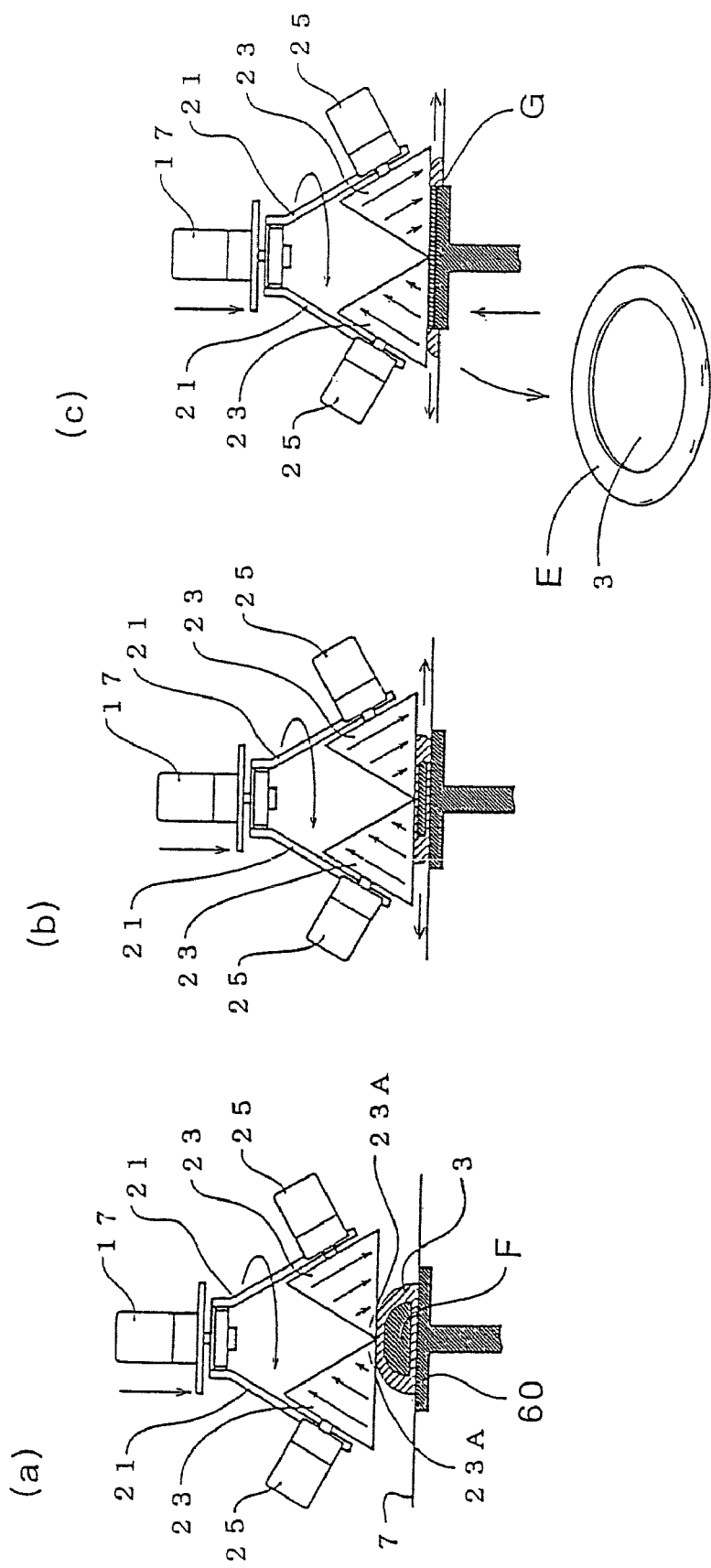

FIG. 16 relates to the embodiment according to the second aspect of the present inventions and shows the steps for rolling food dough on the table which has an outer circumferential and circular area that is slightly lower than the area of the center of it.

Figure 17:
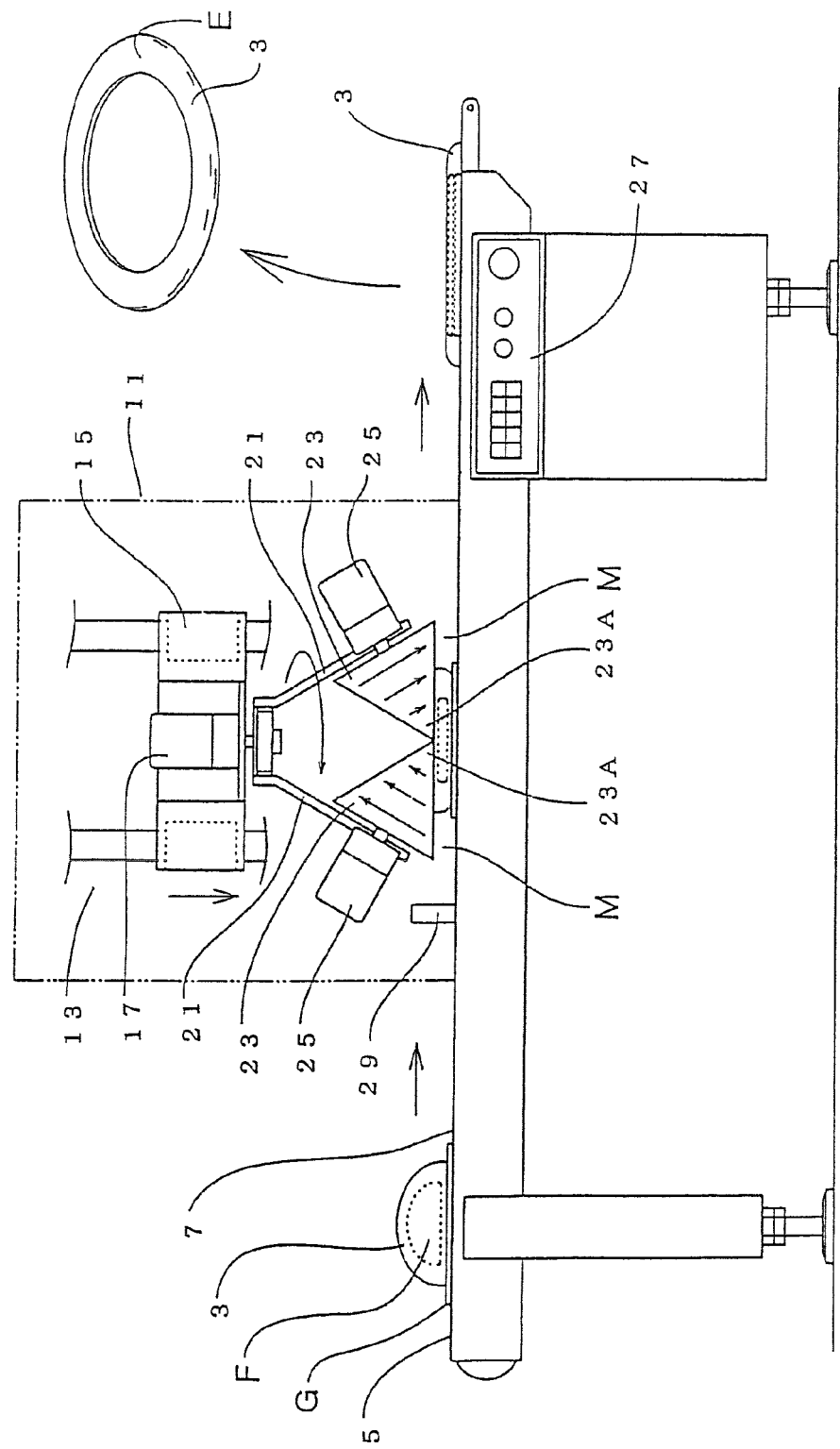

FIG. 17 relates to the embodiment according to the second aspect of the present inventions and shows the steps for rolling food dough on an conveyer which has a circular area that is slightly higher than the rest of the conveyer.

Figure 18:
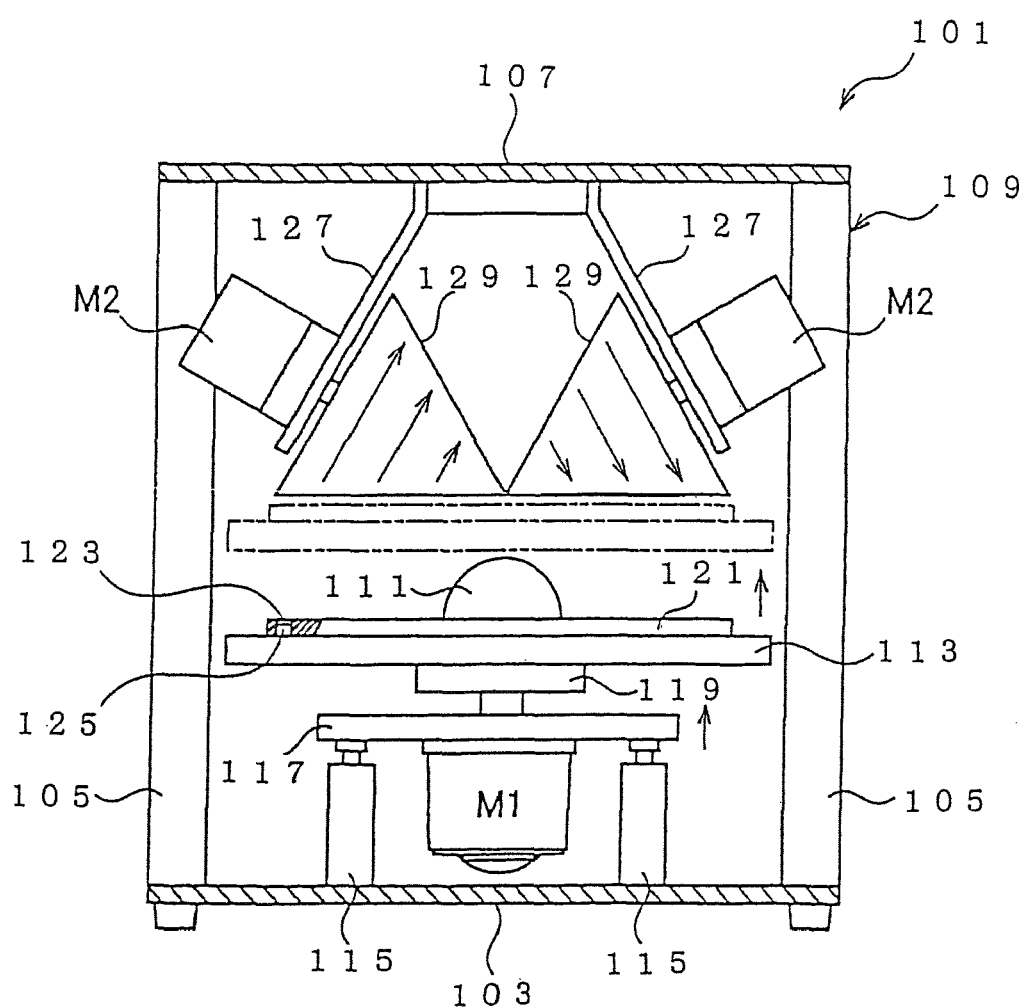

FIG. 18 relates to an embodiment according to the third aspect of an apparatus for rolling food dough of the present inventions and shows a conceptual and elevational view of the apparatus.

Figure 19:
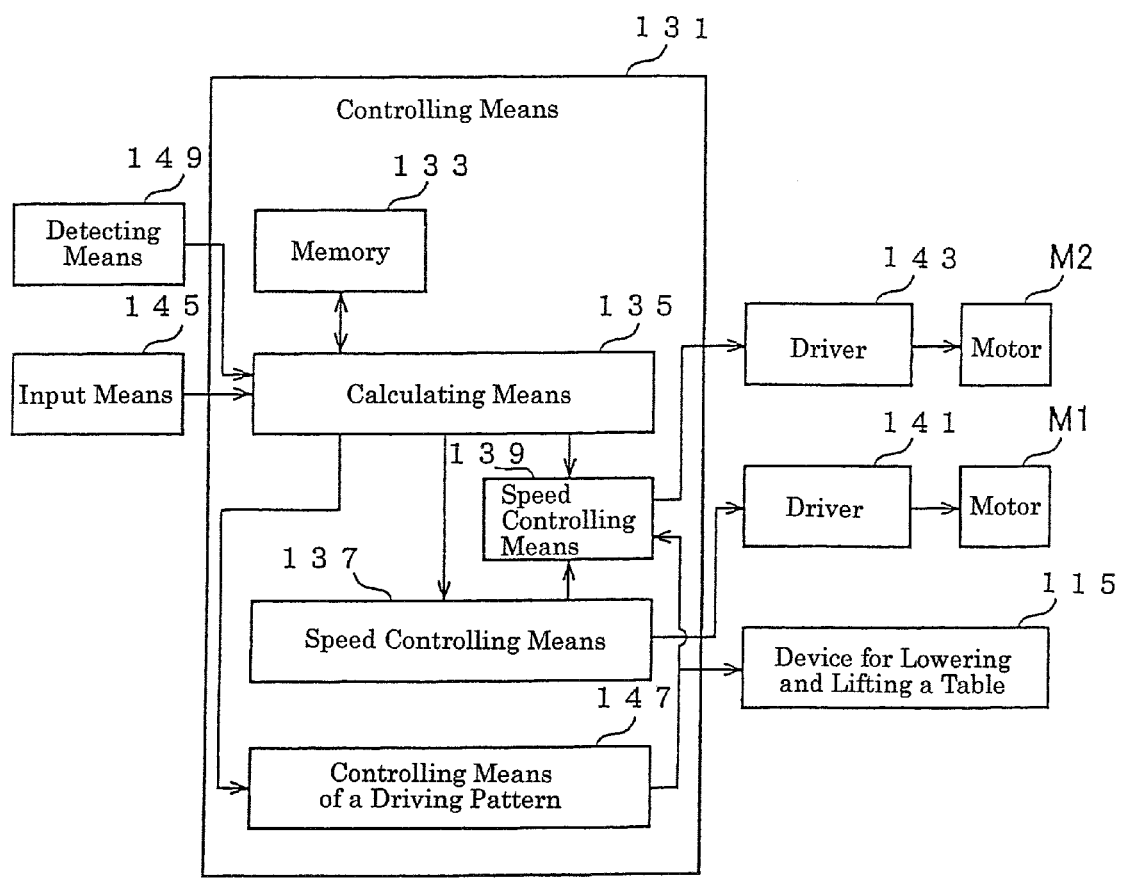

FIG. 19 shows a block diagram indicating the main constitution of the controlling means of the embodiment according to the third aspect of the apparatus for rolling food dough of the present inventions.

Figure 20:
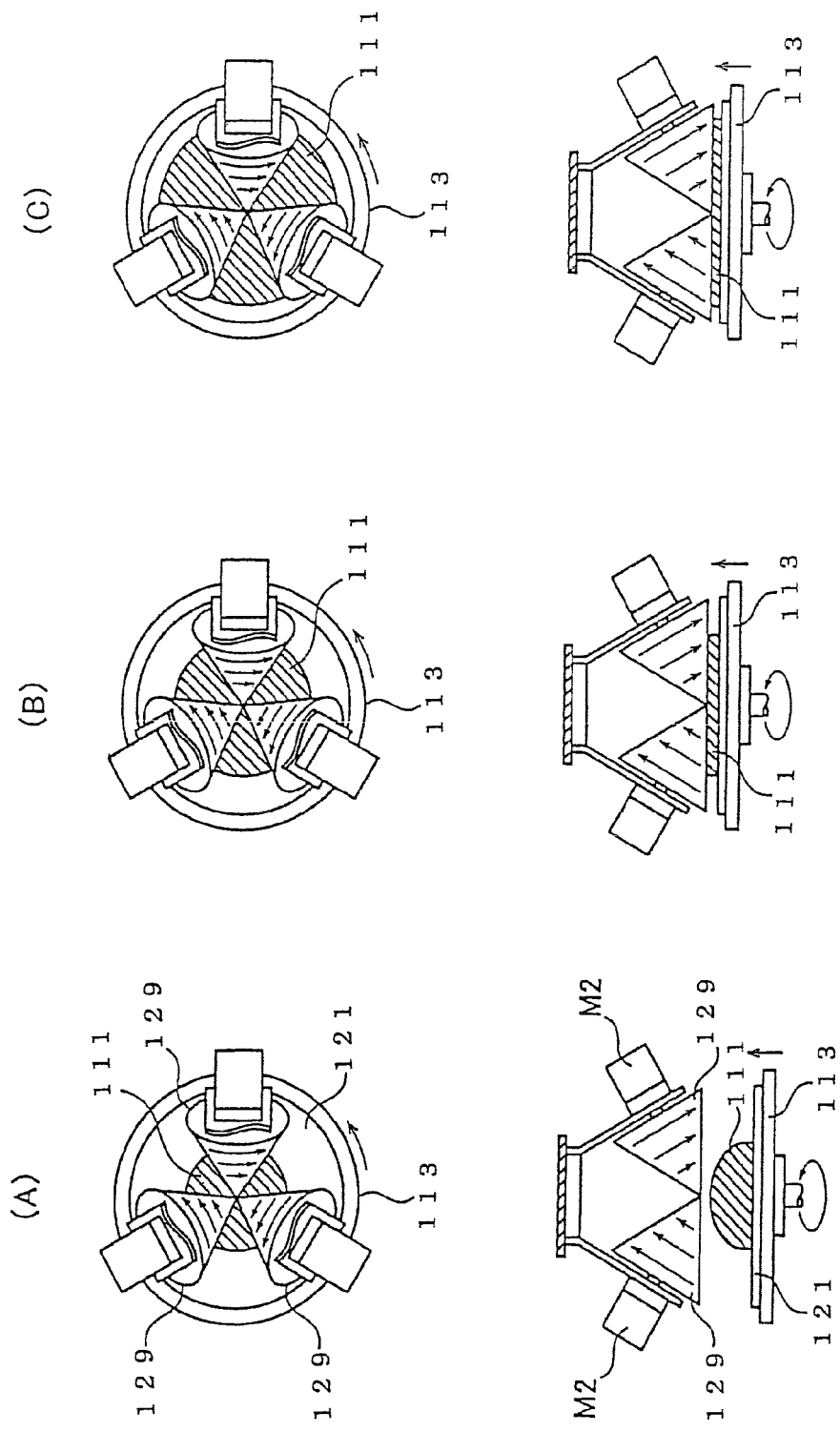

FIG. 20 relates to the embodiment according to the third aspect of the present inventions and shows the steps for rolling the food dough of the embodiment.

FIG. 21 relates to the embodiment according to the third aspect of the present inventions and shows alternative steps for rolling the food dough of the embodiment.

Figure 22:
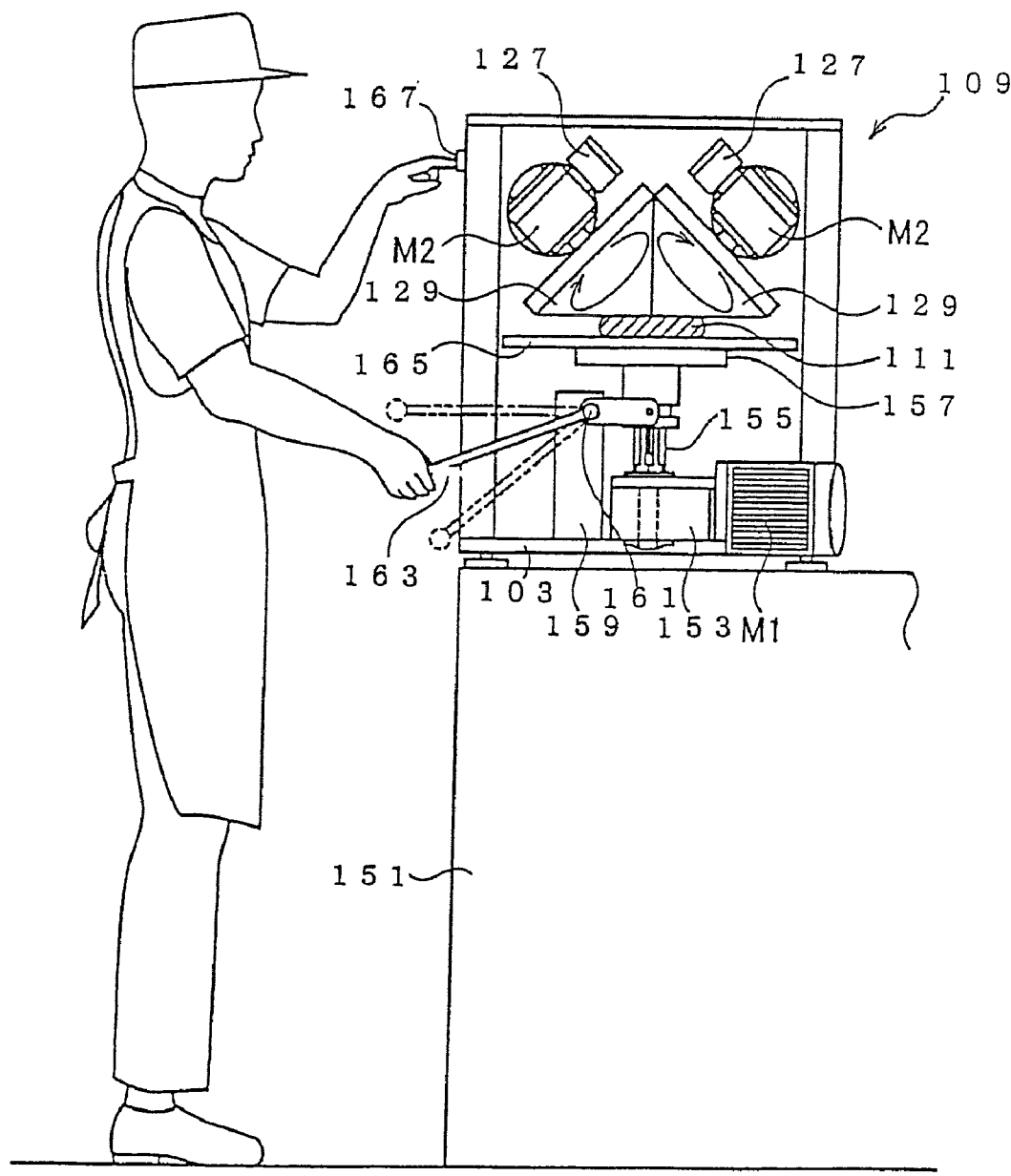

FIG. 22 relates to another embodiment according to the third aspect of the apparatus for rolling food dough of the present inventions and shows a conceptual and elevational view of the apparatus.

DETAILED DESCRIPTION OF THE PREFERRED EMBODIMENTS

Figure 1:
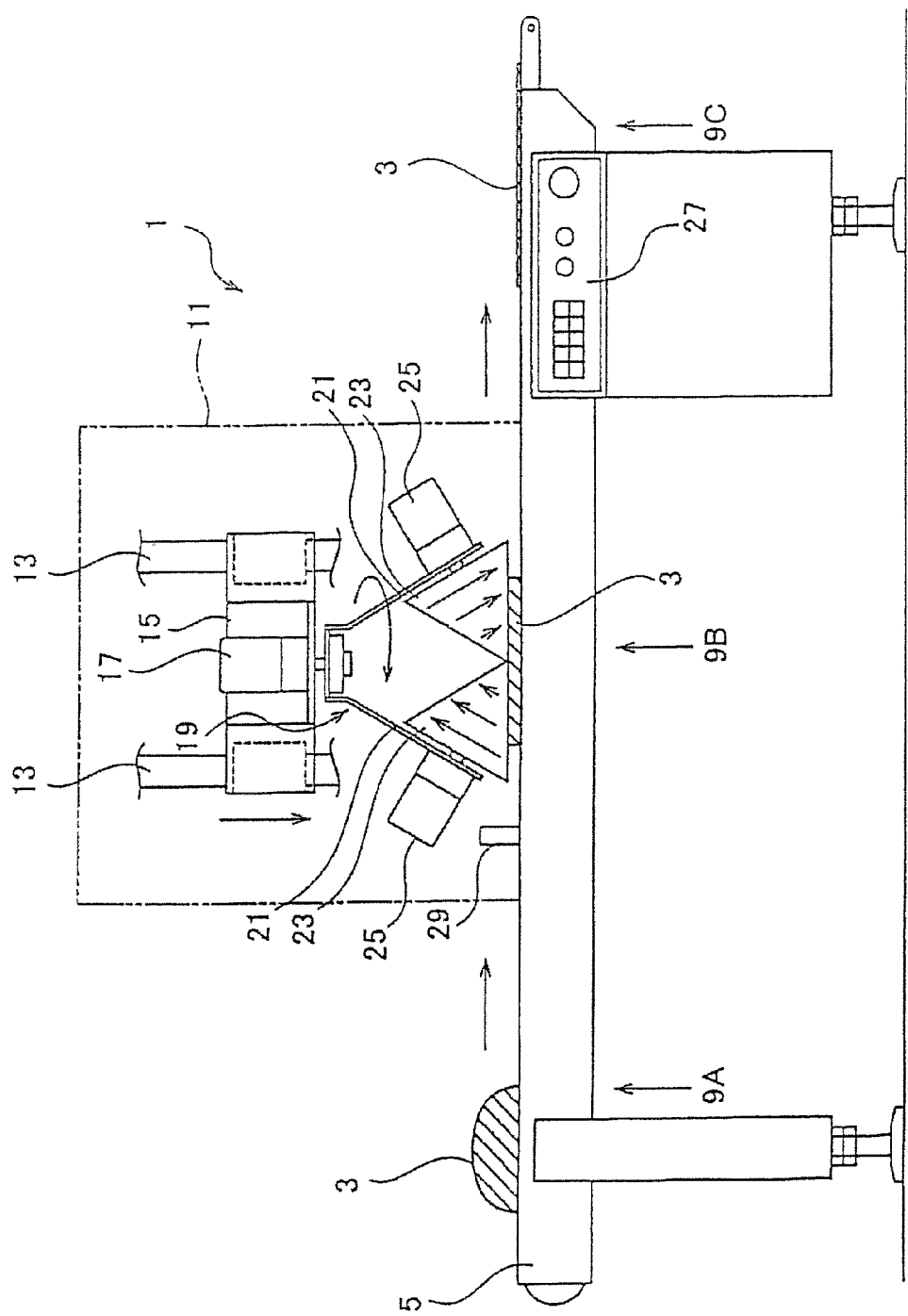
Figure 2:
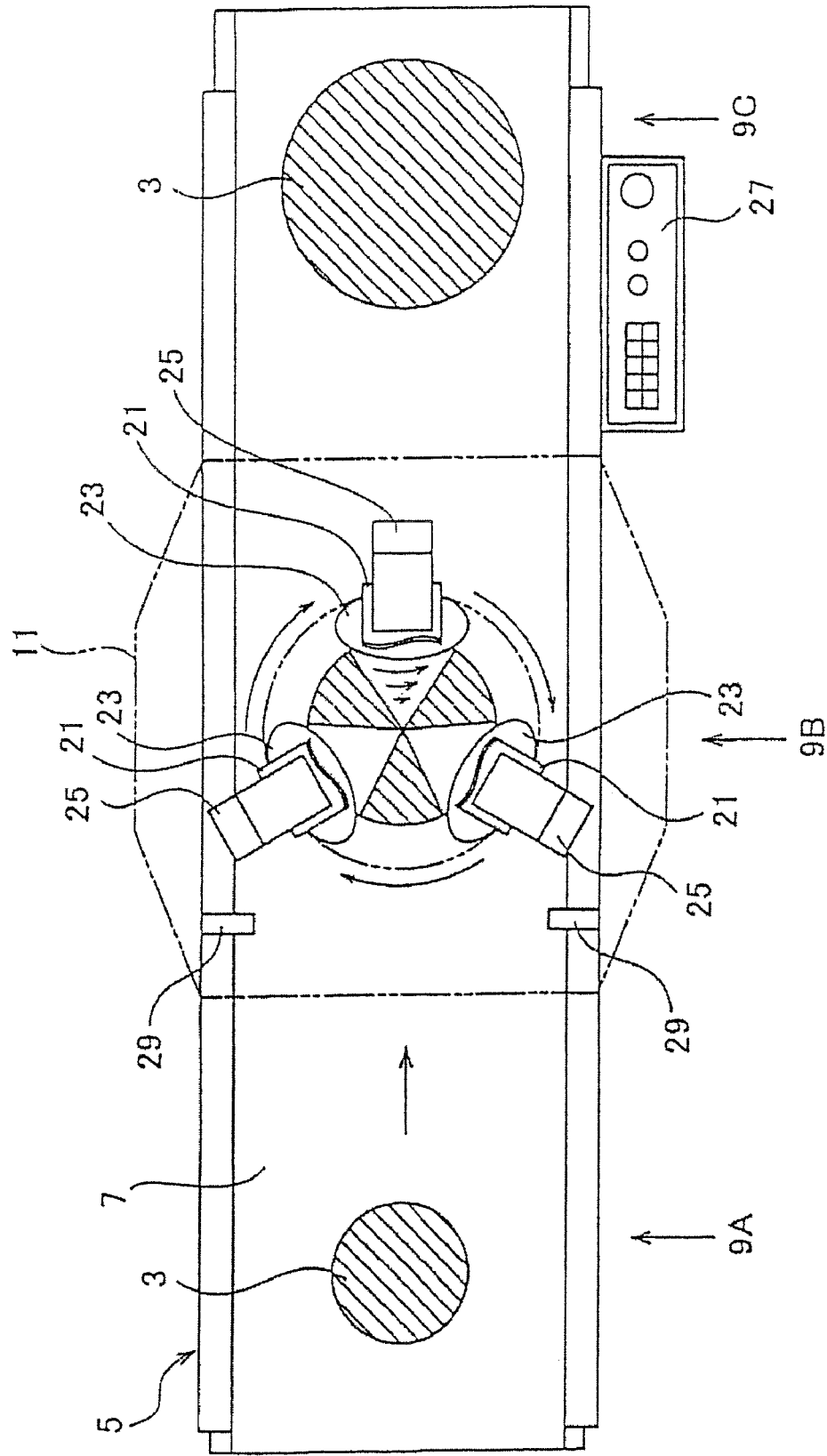

As shown in FIGS. 1 and 2, for an embodiment according to the first aspect of an apparatus for rolling food dough of the present inventions, the apparatus 1 is comprised of a counter 5, which is used as a kind of a table, for placing a block of food dough 3 with an arbitrary shape, and a conveyer belt 7 disposed on the counter 5 for conveying the food dough 3, which conveyer belt 7 is used as a kind of conveying means. The conveyer belt 7 can sequentially convey the food dough 3 from the position 9A for supplying it to the position 9C for taking it out through the position 9B for rolling it.

For the embodiment shown in FIGS. 1 and 2, the conveyer belt 7 is constituted of a continuous belt. However, the conveyer belt 7 can be constituted of three separated belts, one for each position 9A, 9B, and 9C.

At the position 9B, an upper frame 11 (not shown) is located above the counter 5. An ascending and descending cradle 15 is attached to guide members 13 disposed in the upper frame 11, wherein the cradle 15 can relatively ascend away from and descend toward the counter 5. The cradle 15 can be driven by a driving means (not shown) working as an actuator for lifting and lowering it, such as a hydraulic cylinder or a ball screw driven by a servomotor.

The cradle 15 is provided with a motor 17 for swiveling the rolling rollers. The output shaft of the motor 17 is connected to a structural member 19 for supporting rolling rollers 23. The structural member 19 is provided with a hub flange connected to the output shaft of the motor 17 and a plurality of supporting arms 21 extending obliquely downward from the hub flange. The plurality of the arms 21 is located at even intervals around the hub flange. The arms slant downward and widen toward the distal end so that at the distal end the intervals between the arms become large. Conical-shaped rolling rollers 23 are rotatably disposed at the distal end of the supporting arms 21. Motors 25 for rotating the rolling rollers are also disposed at the distal end of the supporting arms 21. As shown in FIG. 2, the plurality of the rolling rollers 23 are placed at even intervals in the circumferential direction. The leading edges 23A of the rolling rollers 23 are placed near the position on the axis of the output shaft of the motor 17. The rolling rollers are arranged so that the bottom generatrices of the conical-shaped rolling rollers 23 become horizontal and are in the same plane.

According to the embodiment explained in the above paragraph, the driving means (the actuator) can lift and lower the cradle 15. The motor 17 can swivel the rolling rollers 23 through the structural member 19. Further, each motor 25 can rotate each rolling roller 23. Thus, since the rolling rollers can swivel and rotate, and since the rolling rollers can descend and press the food dough 3, the food dough 3 placed on the position 9B for rolling it can be rolled so that it has a disk-shaped configuration.

The apparatus 1 for rolling the food dough is provided with a controlling means 27 to control the apparatus 1. The apparatus is also provided with a detecting means 29 to detect the food dough 3 being transferred to the position 9B for rolling it. The detecting means 29 is comprised of a photo sensor to optically detect the food dough 3 being transferred to the position 9B for rolling it.

Figure 3:
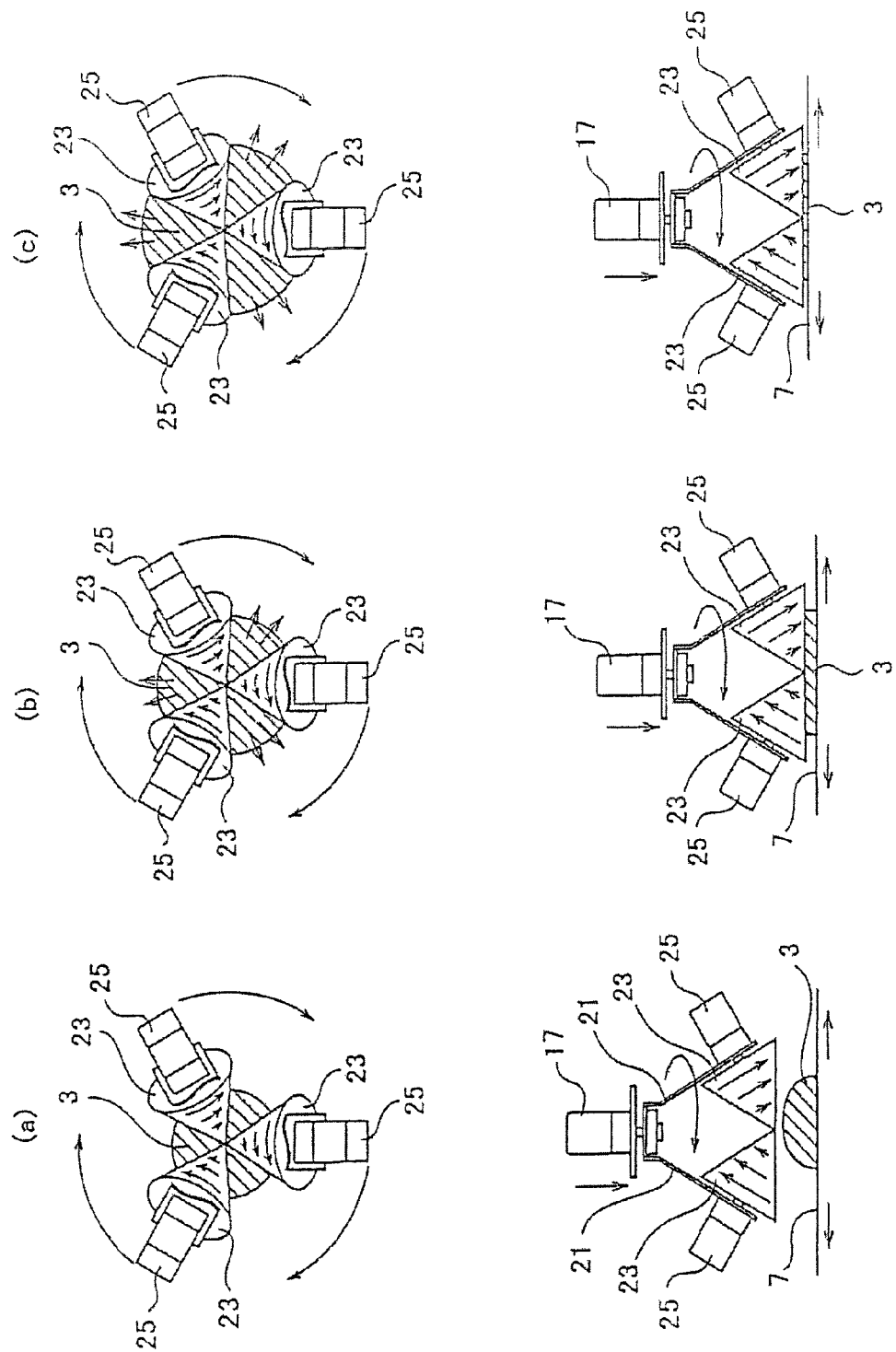

According to the embodiment explained in the above paragraph, first, the food dough 3 is supplied to the position 9A, and then it is transferred to the position 9B for rolling it. Then, the rolling rollers 23 are swiveled by the motor 17 controlled by the controlling means 27. The rolling rollers 23 are also rotated by the motors 25 controlled by the controlling means 27. Then, since the cradle descends toward the food dough 3 so that it is pressed by the rolling rollers, the food dough 3 is rolled and formed into a disk-shaped configuration. (See FIG. 3.)

For the rolling step, the rolling rollers 23 are rotated by the motor 25 so that they rotate at a speed higher than that when they are passively rotated by the swiveling motion by the motor 17. Namely, the speed of the rotation of the rolling rollers is maintained at a slightly higher speed than that when they are passively rotated by the swiveling motion. Here, the speed of the rotation of the rolling rollers when they are passively rotated by the swiveling motion is defined as a "passive speed." More particularly, the rolling rollers rotate at a speed 1.05-1.4 times higher than the passive speed. Consequently, the food dough can be rolled without causing any slipping between the food dough 3 and the surface of the rolling rollers 23. Further, when the rolling rollers are rotated at a slightly higher speed than the passive speed, if ribbed-like embossments are caused to form at the front of the rolling rollers 23, the ribbed-like embossments are drawn into the gap between the rolling rollers 23 and the surface of the counter 5. Thus, it is possible to effectively solve the problem about the ribbed-like embossments.

Since the peripheral speed of the base end of the conical-shaped rolling rollers 23 is higher than that of the leading edges of them, the food dough 3 tends to be drawn toward the base end of them from the leading edges of them (in the radial direction). Thus, the food dough 3 can be formed to be a proper shape, such as a disk-shaped configuration, by the synergetic effect caused by pressing it by the rolling rollers 23 and by rotating the rolling rollers 23 at a higher speed.

For this embodiment, since food dough 3 having a substantially spherical shape is rolled, disk-shaped food dough can be manufactured. However, if food dough 3 having a substantially tetragonal shape is rolled, the food dough 3 shaped like a plate having a square shape can be manufactured.

Thus, in comparison with when the food dough 3 is rolled by the rolling rollers 23 rotating at the passive speed, since according to this invention it can be effectively rolled, it is possible to improve the productivity.

It is possible to set the speed of the rotation of the rolling rollers 23 below 1.05 times higher than the passive speed. However, for this condition, the effect for drawing the food dough 3 into the gap between the rolling rollers 23 and the surface of the counter 5 is not enough. Thus, since it takes a long time to roll the food dough 3, it is difficult to improve the productivity. Namely, it is preferable to set the speed of the rotation of the rolling rollers 23 more than 1.05 times higher than the passive speed.

Further, it is possible to set the speed of the rotation of the rolling rollers 23 more than 1.4 times higher than the passive speed. However, for this condition, at the position of the front of the rolling rollers 23 the effect for drawing the food dough 3 into the gap between the rolling rollers 23 and the surface of the counter 5 becomes excessive. Thus, since stresses tend to remain in the food dough 3 when the rolling rollers 23 are removed from the food dough 3 after rolling it, the food dough 3 tends to shrink because of the stresses in it. Namely, that is not preferable.

As explained in the above paragraph, it is preferable to set the scope of the speed of the rotation of the rolling rollers 23 between 1.05 and 1.4 times higher than the passive speed. It is preferable to select the proper speed of the rotation of the rolling rollers 23 based on the properties of the food dough 3.

Many types of food dough 3, such as food dough having a round shape, food dough that has been left standing for several tens of minutes, fermented food dough, and food dough preliminarily rolled so that it has a predetermined thickness, can be rolled by the method.

As explained previously, the food dough 3 rolled at the position 9B for rolling it is transferred to the position 9C for taking it out by the conveyer belt 7, and then it is removed from the position 9C to start another step.

For the embodiment, it is explained that the method for rolling food dough 3 allows the rolling rollers 23 to descend toward the food dough 3 so that the distance between the rolling rollers 23 and the surface of the counter 5 becomes a predetermined value. However, it is also possible to roll the food dough 3 by allowing it to relatively ascend toward the rolling rollers 23 placed at a predetermined position. Namely, either method for rolling the food dough 3, namely, allowing the rolling rollers 23 to relatively descend or allowing food dough 3 to relatively ascend, can be used. Thus, it is possible to roll the food dough 3 by allowing a part of the conveyer belt 7, on which the food dough 3 is disposed, to ascend.

Figure 4:
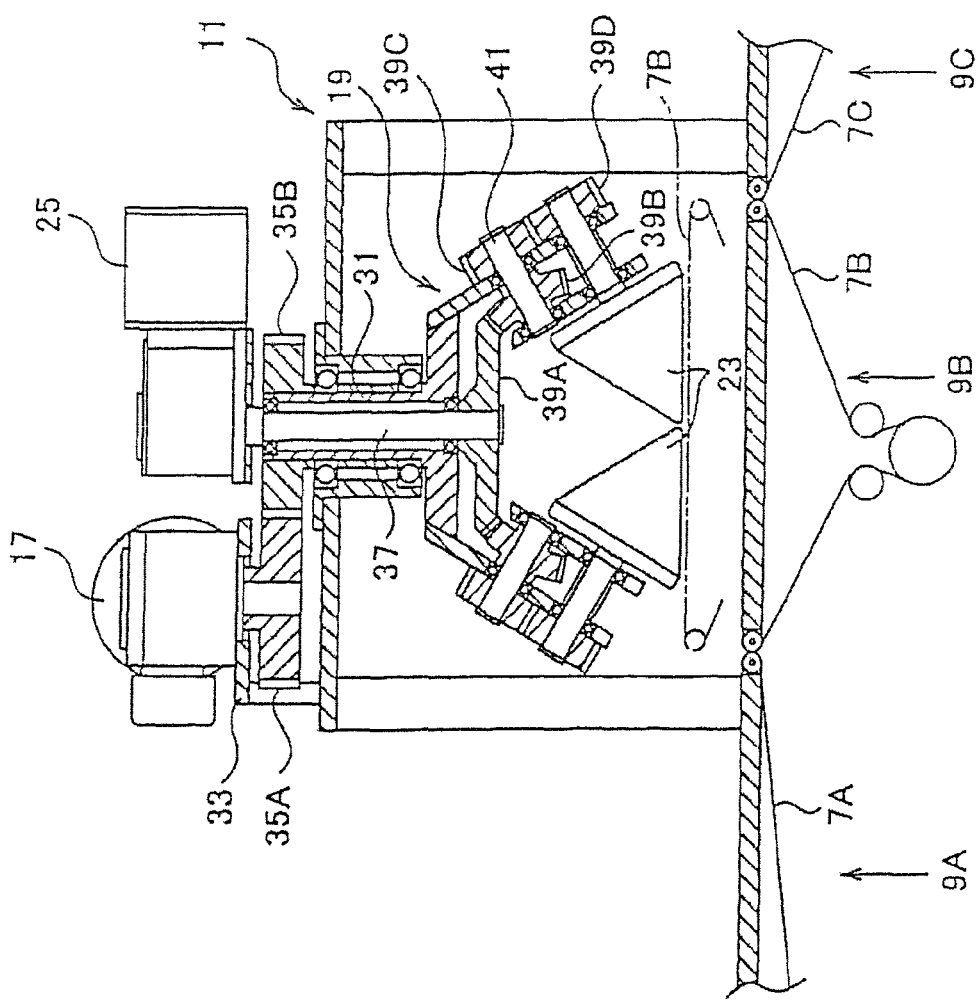

FIG. 4 relates to a second embodiment according to the first aspect of the apparatus for rolling food dough of the present inventions and shows a conceptual view of the apparatus. The same numbers are used in FIG. 4 to denote the same elements as those in the previous embodiment. Further, here the part of the explanation that overlaps is omitted.

For the second embodiment, the conveyer belt 7 is divided into three parts, a conveyer belt 7A, a conveyer belt 7B, and a conveyer belt 7C, corresponding to the position 9A for supplying food dough, the position 9B for rolling it, and the position 9C for taking it out, respectively. Further, the conveyer belt 7B, which corresponds to the position 9B, can relatively ascend toward and descend away from the rolling rollers 23 by a lifting and lowering means (not shown). The conveyer belts 7A, 7B, and 7C are driven by respective motors (not shown).

For the second embodiment, the food dough 3 is placed on the conveyer belt 7B. The conveyer belt 7B can ascend toward the rolling rollers disposed above it at a predetermined height. Thus, the conveyer belt 7B corresponds to the table, and the upper frame 11 supporting the rolling rollers corresponds to the ascending and descending cradle 15, because the upper frame 11 can ascend away from and descend toward the conveyer belt 7B.

A cylindrical rotating shaft 31 is rotatably and perpendicularly suspended from the upper frame 11. Further, the structural member 19 for supporting rolling rollers 23 is located at the lower end of the cylindrical rotating shaft 31. The motor 17 for swiveling the rolling rollers 23 is mounted on the motor bracket 33 attached to the upper frame 11 and rotates the rotating shaft 31. A driving gear 35A connected to the motor 17 is engaged with a driven gear 35B. Namely, the motor 17 for swiveling the rolling rollers 23 and the rotating shaft 31 can be connected to each other by means of a proper transmission, such as a gear mechanism.

To rotate the rolling rollers 23 supported by the structural member 19, the motor 25 for rotating the rolling rollers 23 is mounted on the motor bracket 33. The motor 25 and the rolling rollers 23 are connected to each other with a proper transmission. Particularly, a rotating shaft 37 is rotatably disposed in the cylindrical rotating shaft 31, which is rotated by the motor 25 for rotating the rolling rollers 23. A gear (a bevel gear) 39A, attached to the lower end of the rotating shaft 37, is engaged with a gear (a bevel gear) 39B attached to one end of a connecting shaft 41 that is rotatably supported at the structural member 19. The gear 39C, attached to the other end of the connecting shaft 41, is engaged with the gear 39D attached to the end of the shaft of the rolling rollers 23. Namely, the motor 25 and the rolling rollers 23 are connected through a series of gears constituting a transmission.

Instead of the series of the gears, a timing belt can be used as the transmission. Namely, the transmission is not limited to the series of gears, and it is possible to use a normal transmission.

For the second embodiment, the same effect as that of the first embodiment can be achieved.

Figure 5:
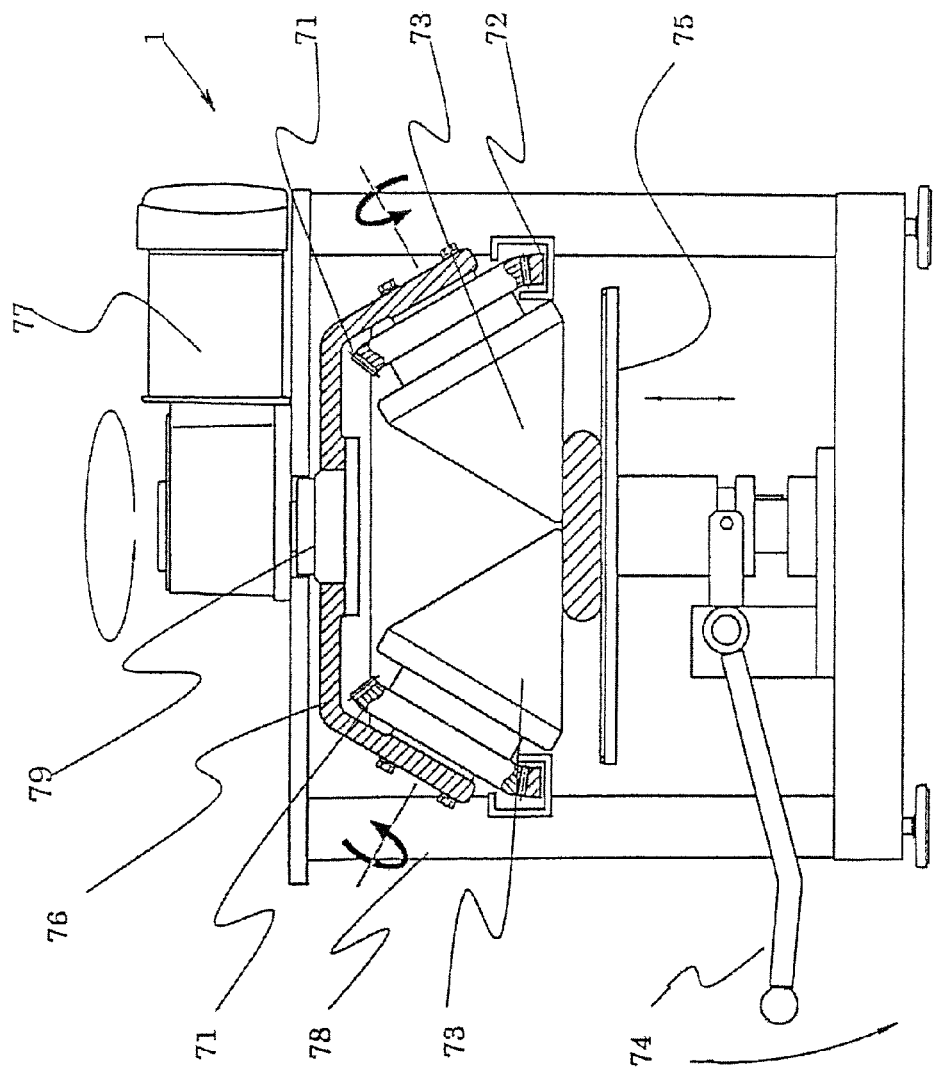
Figure 6:
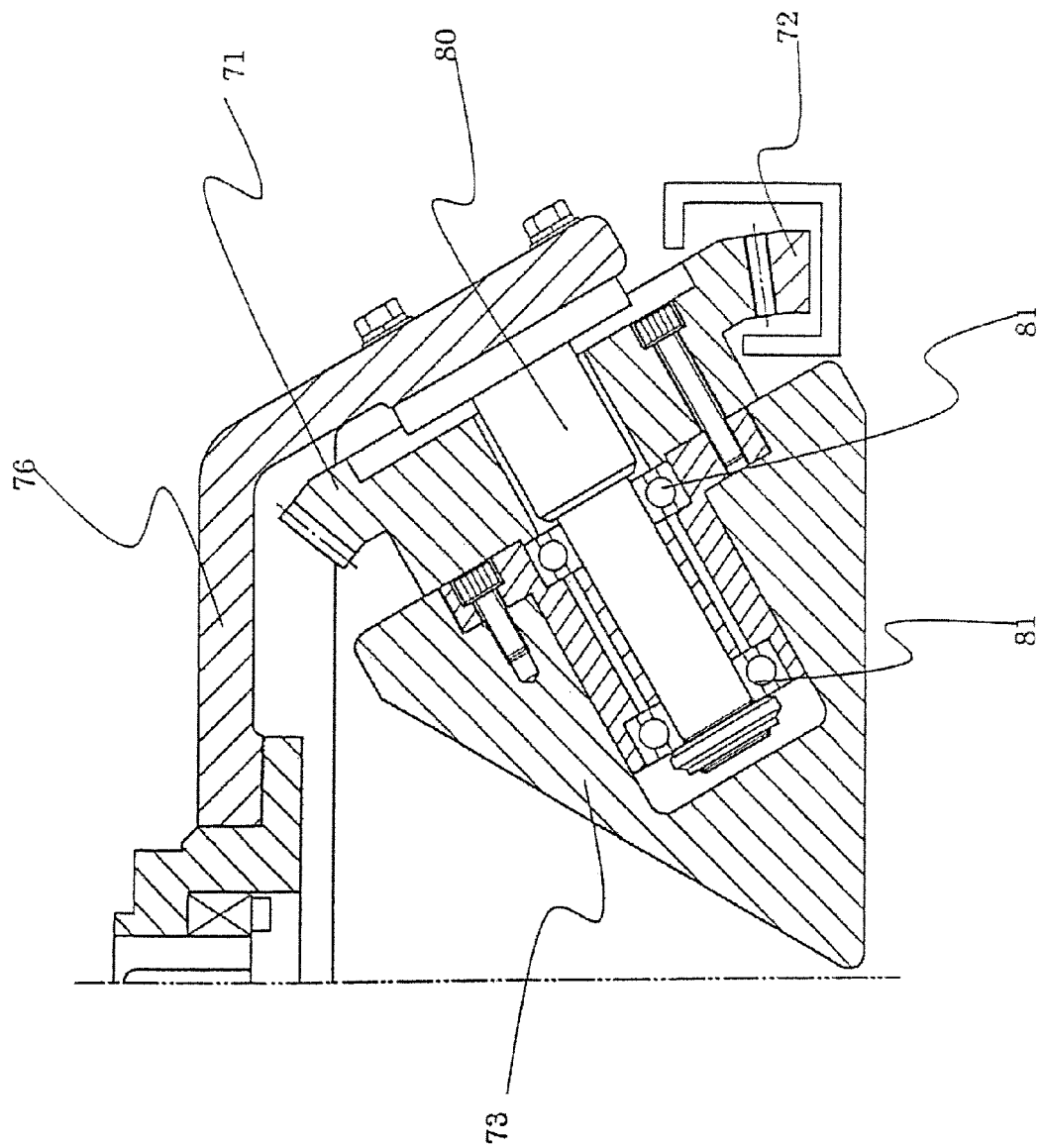

FIGS. 5 and 6 relate to a third embodiment according to the first aspect of the apparatus for rolling food dough of the present inventions and show a conceptual view of the apparatus.

The apparatus according to this embodiment is used by inserting a tray, on which the food dough is placed, at a position below the rolling rollers and removing the tray after the rolling step. Namely it has the same constitution as that of the second embodiment, except for the conveyer belt.

For the third embodiment, a table 75 is not rotatable, but is a stationary type. The table 75 can relatively ascend toward and descend away from rolling rollers 73. FIG. 5 shows that the table 75 can ascend and descend. However, it is also possible to allow the rolling rollers to ascend and descend.

The rolling rollers 73 are supported by an upper frame 78 through a rotating shaft 79 and a structural member 76 for supporting the rolling rollers 73. The motor 77 for swiveling the rolling rollers 73 is connected to the upper end of the rotating shaft 79. A pinion gear 71 is integrated with the rolling rollers 73. Further, a ring-shaped guide gear 72, which is engaged with the pinion gears 71, is mounted on the upper frame 78. Thus, when the rolling rollers 73 are swiveled by the motor 77, since the pinion gears 71 are engaged with the guide gear 72, the rolling rollers can rotate.

The ratio of the speed of the rotation of the rolling rollers 73 to the speed of the swiveling of them is determined by the number of teeth of the pinion gear 71 and the guide gear 72.

The number of teeth of the pinion gear 71 and the guide gear 72 are determined so as to enable the rolling rollers 73 to rotate at a speed higher than that when they are passively rotated by the swiveling motion.

For the third embodiment, the rolling rollers 73 are designed so that they are rotated by using the pinion gears 71 and the guide gear 72. The mechanism for rotating the rolling rollers 73 is not limited to such a method. For example, a mechanism for rotating the rolling rollers 73 by using friction pulleys instead of the pinion gears 71 and the guide gear 72 can be used.

For the third embodiment, the same effect as that of the first embodiment, explained previously, can also be achieved.

According to the previous embodiments, hereafter several types of steps for rolling food dough are explained in detail.

Figure 7:
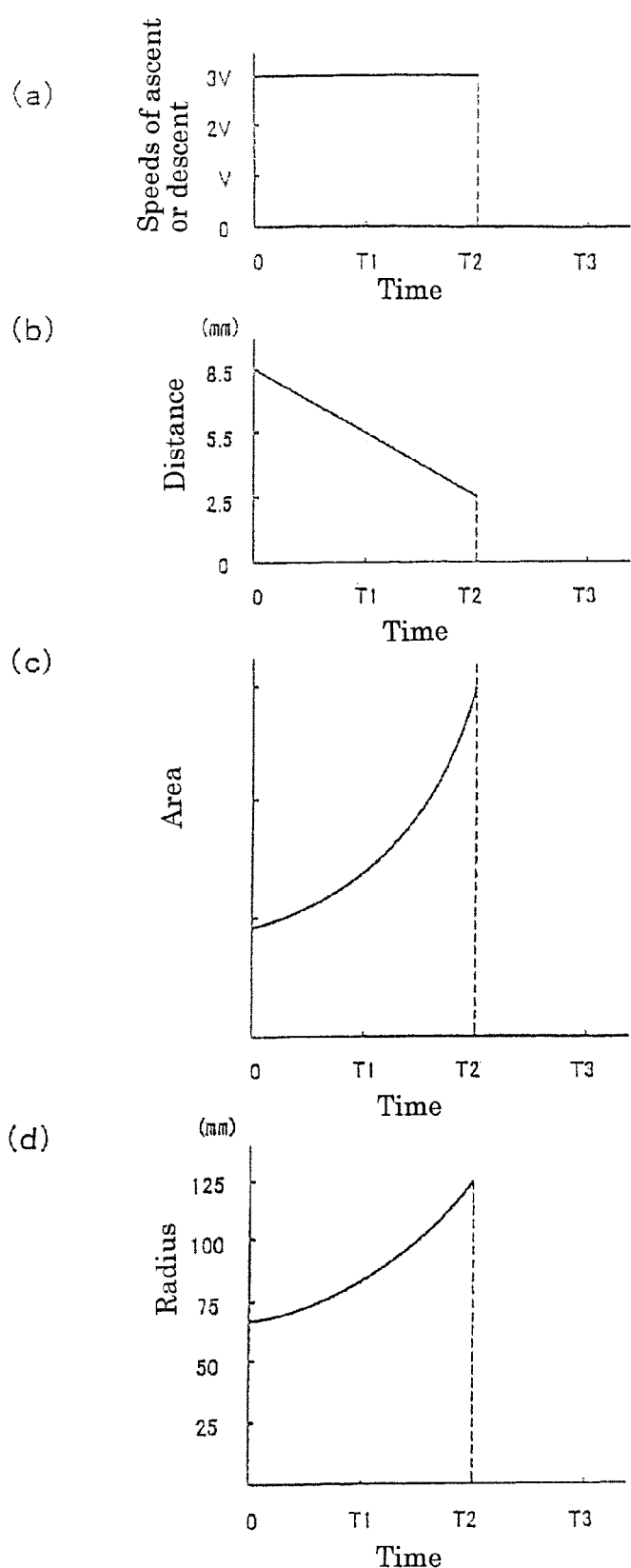
FIG. 7 shows charts indicating the relative speed of the descent of the rolling rollers toward the food dough, the distance between the rolling rollers and the table, the area of the rolled food dough, and the mean radius of the food dough, as a function of time in the rolling step.

For the first example, a block of food dough 3 having a predetermined volume (weight) and having a substantially spherical shape is prepared. Next, as shown in FIG. 7, to roll the food dough 3 so that it has a predetermined thickness for time T2, the food dough 3 is rolled while the speed 3V of the relative descent of the rolling rollers 23 toward the conveyor belt 7 (7B) is maintained at a constant value. The constant value means substantially the same speed as that used in a method for rolling normal food dough, and the conveyor belt 7 (7B) is used as a table. Then, when the distance between the rolling rollers 23 and the conveyor belt 7 (7B) reaches a predetermined value so that the food dough 3 has a target thickness, the relative descent of the rolling rollers 23 toward the conveyor belt 7 (7B) is stopped. As shown in FIG. 7(b), the distance between the rolling rollers 23 and the conveyor belt 7 (7B) becomes inversely proportional to the time. The mean radius of the food dough 3 increases according to the curve of the second order, as shown in FIG. 7(d). The area of the food dough 3 drastically increases according to the curve of the fourth order, as shown in FIG. 7(c).

For the second example, a block of food dough 3 having the same volume (weight) as that of the first example and having a substantially spherical shape is prepared. Next, as shown in FIG. 8, the speed 2V of the relative descent of the rolling rollers 23 toward the conveyor belt 7 (7B) is set to be ⅔ of the speed 3V of the first example. Thus, it takes time T3 to roll the food dough, which is 1.5 times T2 of the first example. FIGS. 8(b), (c), and (d) show the data of the second example. For the second example, as shown in FIG. 8(c), the area of the food dough 3 drastically increases according to the curve of the fourth order.

When the food dough 3 is rolled, if the area of the food dough 3 drastically increases, as explained above, excessive stresses may be caused in the food dough. Consequently, the food dough 3 may be damaged by them.

To solve the problem, the following step (the third example) can be employed for rolling food dough 3. Namely, a block of food dough 3 having the same volume as that of the first example and having a substantially spherical shape is prepared. As shown in FIG. 9(a), the food dough 3 is rolled at the speed 3V of the relative descent of the rolling rollers 23 during time 0 to time T1. Then, during time T1 to T3, the speed of the relative descent of the rolling rollers 23 becomes inversely proportional to the time. When the distance between the rolling rollers 23 and the conveyor belt 7 (7B) reaches a predetermined value so that the food dough 3 has a target thickness, the relative descent of the rolling rollers 23 is stopped.

For the third example, as shown in FIG. 9(c), the degree of the increase of the area of the food dough 3 can be reduced at the end of the rolling step.

Further, as shown in FIG. 10(a), which shows the fourth example, the food dough 3 is rolled at the speed 3V of the relative descent of the rolling rollers 23 during time 0 to time T1. Then, during time T1 to T3, the speed of the relative descent of the rolling rollers 23 decreases in geometrical series. When the distance between the rolling rollers 23 and the conveyor belt 7 (7B) reaches a predetermined value so that the food dough 3 has reached a target thickness, the relative descent of the rolling rollers 23 is stopped.

For the fourth example, as shown in FIG. 10(c), the degree of the increase of the area of the food dough 3 can be reduced at the end of the rolling step.

Further, as shown in FIG. 11, which shows the fifth example, it is also possible to reduce the degree of the increase of the area of the food dough 3 at the end of the rolling step by stepwise decreasing the speed of the relative descent of the rolling rollers 23.

Namely, when the food dough 3 is rolled by relatively lowering the rolling rollers 23 for the food dough 3 placed on the conveyor belt 7, it is preferable to reduce the speed of the relative descent of the rolling rollers 23 for the food dough 3 at the end of the rolling step, even if the speed at the early rolling step is high.

For these rolling steps, during a certain early time of the rolling step or until the thickness of the food dough 3 reaches a certain value, that is considerably greater than the target thickness, it is preferable to maintain the speed of the relative descent of the rolling rollers 23 to be constant.

The controlling means 27 to control the apparatus 1 is comprised of a computer. The constitution of the computer is shown in FIG. 12. Namely, the controlling means 27 is connected to an input means 43 and to sensors used as a detecting means 29 to sense the food dough 3.

The controlling means 27 is further comprised of a calculating means 45 and a speed controlling means 47 to control the rotations of the motors 17, 25 for swiveling and rotating the rolling rollers 23. The speed controlling means 47 is comprised of a speed calculating means 49 to automatically calculate the speed of the rotation of the motor 25 for rotating the rolling rollers 23 when the speed of the rotation of the motor 17 for swiveling the rolling rollers 23 is determined. Further, the speed controlling means 47 is electrically connected to the motor 17 for swiveling the rolling rollers 23 and the motor 25 for rotating them through the drivers 51, 53 for the motors 17, 25.

The controlling means 27 is further comprised of a speed controlling means 57 of the conveyor belt 7 to control the rotation of the motor 55 for driving it. The speed controlling means 57 of the conveyor belt 7 is electrically connected to the motor 55 for driving the conveyor belt 7 through the drivers 59 for the motors 55.

The controlling means 27 is further comprised of a controlling means 61 of a driving pattern to control the relative speed of the descent of the rolling rollers 23 toward the food dough 3. The controlling means 61 of the driving pattern is connected to a device 62 (used as an actuator for lowering and lifting the rolling rollers 23). The device 62 is used for relatively lowering and lifting the rolling rollers 23 for the food dough 3.

The controlling means 27 is further comprised of a memory 63 for storing the data of the profile of the speed for relatively lowering the rolling rollers 23, which data is shown in FIGS. 9(a), 10(a), and 11(a), for example.

For the embodiment explained in the above paragraphs, the motor 55 for driving the conveyor belt 7 is rotated at a constant speed by the speed controlling means 57 of it. While the conveyor belt 7 is driven at a constant speed, a block of food dough 3 having a predetermined volume is supplied to the position 9A of the conveyor belt 7 for supplying it. Then the food dough 3 is transferred to the position 9B for rolling it. When the food dough 3 is transferred to the position 9B, the detecting means 29 (a sensor) detects the food dough 3, and sends a signal to the calculating means 45. Then, the length of the food dough 3 along the conveyor belt 7 is calculated based on the time that the food dough 3 is passing by the location of the front of the sensor 29. The center position of the food dough 3 is also calculated in the direction of the movement of the conveyor belt 7.

When the center position of the food dough 3 is determined, the transferring time from when the front end of the food dough 3 is detected by the sensor 29 to when the center of the food dough 3 reaches the center of the position 9B can be calculated by the calculating means 45. Further, the transferring time is measured. When the measured transferring time becomes equal to the calculated transferring time, the signal to stop the conveyer belt 7 is sent to the speed controlling means 57 of it. Consequently, the food dough 3 is positioned at the center of the position 9B for rolling it.

As the positioning method to determine the location of the food dough 3 so that the center of the food dough 3 corresponds to the center of the position 9B for rolling it, it is possible to use the following method. Namely, just after the sensor 29 detects the rear end of the food dough 3, the food dough 3 is moved a distance that can be determined by subtracting the distance between the center of the food dough 3 and the location of the sensor 29 from the distance between the center of the position 9B and the location of the sensor 29.

After the food dough 3 is positioned so that the center of the food dough 3 corresponds to the center of the position 9B, as explained above, the rolling rollers 23 are swiveled by the motor 17 and also rotated by the motor 25, wherein the motors 17 and 25 are controlled by the speed controlling means 47. When the speed of the rotation of the motor 17 for swiveling the rolling rollers 23 is determined, the speed of the rotation of the motor 25 for rotating them is calculated by the speed calculating means 49 so that the rolling rollers rotate at a speed 1.05-1.4 times higher than the passive speed. Then the motor 25 is controlled based on the calculated speed of its rotation.

The ratio of the speed of the rotation of the rolling rollers 23 to the speed of the rotation of them when they are passively rotated by the swiveling motion can be arbitrarily selected to be between 1.05 and 1.4 based on the properties of the food dough 3. The selected ratio can be input through the input means 43. Further, it is effective to use a memory (not shown) that stores data that includes actual data or experimental data regarding the relationship between the speed for swiveling the rolling rollers 23 and the speed for rotating them. Namely, it is possible to determine the speed for swiveling the rolling rollers 23 and the speed for rotating them by searching the data in the memory.

After the rolling rollers 23 are swiveled and rotated as explained above, the device 62 for lowering and lifting the rolling rollers 23 is driven by the controlling means 61 of a driving pattern, the rolling rollers 23 are relatively lowered toward the food dough 3, and then it is rolled.

It is also possible to control the device 62 for lowering and lifting the rolling rollers 23 based on the proper data about the driving pattern, which is stored in the memory 63.

Further, it is possible to use the following method. Namely, for example, the data of the speeds of the descent of the rolling rollers 23 corresponding to the time intervals 0-T1, T1-T2, and T2-T3 shown in FIGS. 9(a), 10(a), and 11(a) is input to the calculating means 45 through the input means 43. Alternatively, a predetermined speed of their descent is input to the calculating means 45. Based on that data the speed of the descent of the rolling rollers 23 corresponding to the time intervals is calculated by the calculating means 45 based on the data. The device 62 for lowering and lifting the rolling rollers 23 can be controlled by the controlling means 61 based on the results of the calculation.

It is preferable to select the driving pattern of the device 62 to roll the food dough 23 based on the properties of it.

After the food dough 3 is rolled so that it has a disk-shaped form by relatively lowering the rolling rollers 23 toward the food dough 3 by the device 62, the food dough 3 is taken out from the position 9C for removing it to transfer it to the next step.

As explained in the above paragraphs, according to the embodiment, the rolling rollers 23 are rotated at a speed higher than that when they are passively rotated by the swiveling motion, and are pressed against the food dough 3 to roll it, wherein the speed of the descent of the rolling rollers 23 at the end of the rolling step is lower than that at the early rolling step. Thus, it is possible to roll the food dough 3 without causing slipping between the surface of it and the rolling rollers 23 and without causing stresses in it. Consequently, since the food dough 3 can be efficiently rolled, it is possible to improve the productivity.

Further, the relative speed of the descent of the rolling rollers 23 for the food dough 3 is not limited to those patterns shown in FIGS. 9, 10, and 11. It is possible to use an arbitrary pattern so that, for example, the rolling rollers 23 stop descending at an arbitrary height. Namely, it is possible to select the proper driving pattern for the speed of the descent of the rolling rollers 23 based on the properties of the food dough 3.

The device 62 for lowering and lifting the conveyer belt 7B or the cradle 15 requires a mechanism that is responsive to the driving pattern. The driving pattern has a high-speed portion (3V) at the early rolling step and a reduced speed portion at the end of the rolling step, as shown in FIGS. 9(a), 10(a), and 11(a). Thus, a servo mechanism comprising a servo motor and a ball screw, a hydraulic device, such as an air cylinder, a cam mechanism, or a combination of these devices can be used as the device 62.

The conveyer belt 7B or the cradle 15 has to descend or ascend at a high speed at the early rolling step and has to descend or ascend at lower speed so that the speed is gradually reduced. Thus, it is possible to combine the hydraulic device, which is easy to drive at a high speed, with the ball screw mechanism, which is easy to control, or with the cam mechanism, which is used in an apparatus for enveloping a bean-paste, or to combine the ball screw mechanism with the cam mechanism. Namely, an arbitrary mechanism can be used as the device 62 for lowering and lifting the conveyer belt 7B or the cradle 15.

Next, an embodiment according to the second aspect of the apparatus for rolling the food dough of the present invention is explained. The basic constitution of the embodiment is the same as that according to the first aspect of these inventions. Here, the overlapping explanation is omitted.

The projected profile of the rolling rollers 23 of the embodiment according to the second aspect is an isosceles triangle having an angle at the apex of 60 degrees. The generatrices M of the conical-shaped rolling roller 23 (the generatrices faces the conveying surface 7; see FIG. 17) is arranged parallel to the conveying surface of the conveyer belt 7.

In the above paragraph, it is explained that the projected profile of the rolling rollers 23 of the embodiment is an isosceles triangle having an angle at the apex of 60 degrees. However, it is not limited to that. The conical-shaped rolling rollers having a more sharply angled apex or a more obtuse angled apex can be used. The positions of the leading edges of the rolling rollers 23 correspond to the center of a virtual circle C, on which the rolling rollers 23 disposed above a conveyer belt 7 swivel. (See FIG. 2.) The length of the generatrices M of the conical-shaped rolling roller 23 substantially equals the radius of the virtual circle C. The virtual circle C corresponds to the maximum size of the disk-shaped food dough rolled by the rolling rollers 23.

FIG. 13 shows an embodiment for forming a disk-shaped food dough from a substantially spherical block of food dough that includes fillings, such as cream cheese. The food dough 3 that includes the fillings is transferred by the conveyer belt 7, and then it stops below the upper frame 11. The upper frame 11 is disposed above the conveying surface at a predetermined distance. The position of the food dough 3 is determined by controlling the conveyer belt 7 by the controlling means 27 based on the signal of the detecting means 29 (sensor) disposed on the counter 5.

The rolling rollers 23 start to rotate before they contact the food dough. Then, the rolling rollers 23 of the apparatus 1 for rolling the food dough 3 descend by driving the ascending and descending cradle 15. Next, the leading edges 23A of the rolling rollers 23 start to contact the central portion of the food dough 3. The rolling rollers 23 are swiveled clockwise, as seen from above, and are thereby caused to rotate. After the leading edges 23A of the rolling rollers 23 contact the central portion of the food dough 3, the food dough 3 is rolled for a predetermined time by gradually lowering the rolling rollers 23.

First, the inclined plane near the leading edges 23A of the rolling rollers 23 contacts the central portion of the food dough 3, and starts to press and roll it. (See FIG. 13(*a*).) Since the central portion of the food dough 3 is pressed and rolled at the early rolling step, the stability of the food dough 3 at the rolling step can be improved. At that time, the rolling rollers 23 are not rotated by the frictional force between the rolling rollers 23 and the food dough 3, but are thereby caused to rotate by the motors 25. Further, the rolling rollers 23 are caused to swivel by means of the motor 17. Thus, it is possible that the rolling rollers 23 will rotate on the contacting surface of the food dough 3 without causing wrinkles on the surface of it.

Further, the rolling rollers 23 gradually descend, and the contact area between the rolling rollers 23 and the food dough 3 increases. Consequently, the food dough 3 is drawn toward the base end of the conical-shaped rolling rollers 23 (since the peripheral speed of the base end of the conical-shaped rolling rollers 23 is higher than that of the leading edges of them). (See FIGS. 13(*b*) and 13(*c*).)

If the food dough 3 includes the fillings F in it, as shown in FIG. 13, the food dough 3 with the fillings F are together rolled and drawn toward the radial direction. Then, the uniformly layered and disk-shaped food dough 3 that includes the fillings F can be formed.

After a predetermined period of time, the rolling rollers 23 start to ascend, are separated from the food dough 3, and then stop ascending at a predetermined position. Then, the conveyer belt 7 starts to move and transfers the rolled disk-shaped food dough toward the downstream direction.

The conditions for driving the rolling rollers 23, such as the speed of the swiveling of the rolling rollers 23, the speed of the rotation of them, and the time for pressing and rolling the food dough 3, can be determined based on the properties (hardness and softness) of the food dough 3. Further, since it is possible to vary the number of rolling rollers 23, the number of the contact points between the rolling rollers 23 and the surface of the food dough may vary. Thus, it is apparent that those conditions should be changed within the scope of the claims.

By the second aspect of these inventions, the food dough 3 for a pizza having fillings made from cheese (see FIG. 14(*a*)) is rolled to form disk-shaped food dough for a pizza. Consequently, disk-shaped food dough 3 that has a layered portion that includes uniform fillings made from cheese in it and has a rim portion made of only the food dough is produced. (See FIG. 14(*b*).) By baking this food dough 3, it is possible to make pizza that has a layered and thin portion that includes fillings in it and that has a raised rim portion. (See FIG. 14(*c*).)

For the embodiment shown in FIG. 15, after particles of food (sesame seeds, bread crumb, seeds of miscellaneous grain crops, etc.) are uniformly scattered on the surface of the conveyer belt 7, the food dough 3 is placed on it. Then the food dough 3 with particles of food adhering to the bottom surface of it is rolled. For example, after the sesame seeds adhere to the bottom surface of the food dough 3, when it is rolled by the rolling rollers 23, it is possible to not only roll the food dough 3, but also to decorate it by securely adhering the sesame seeds. Consequently, it is possible to manufacture unique food dough 3 that has particles of food adhering to the bottom surface of it.

About the embodiment shown in FIG. 16, it relates to an apparatus for rolling the food dough 3 by using a counter 5 that has a projecting portion G. Particularly, the apparatus is comprised of a pedestal 60. It can ascend away from and descend toward the upper surface of the conveyer belt 7 at the rolling position. When the food dough 3 is rolled by the rolling rollers 23, since the pedestal 60 ascends and slightly projects from the surface of the conveyer belt 7 at the rolling position, the central portion of the food dough 3 is raised from the surface of it. Thus, food dough 3 having a peripheral rim portion can be manufactured. Namely, the apparatus is prepared so that the distance between the rolling rollers 23 and the surface of the conveyer belt 7 at the central portion of the food dough 3 is less than that at the peripheral portion of it, and then the food dough 3 is rolled.

By using the apparatus, it is possible to manufacture food dough 3 that has a thick rim portion. If the rolled food dough 3 is turned over, apparently it has a central and thin portion and a thick rim portion E, as shown in FIG. 16(*c*).

Alternatively, it is possible to use the conveyer belt 7 having a projected portion G instead of the pedestal 60, which can ascend and descend. (See FIG. 17.)

Next, an embodiment according to the third aspect of the apparatus for rolling food dough of the present inventions is explained. As shown in FIG. 18, the apparatus 101 for rolling food dough according to the embodiment is comprised of a plurality of columns 105 disposed on the base member 103 and a supporting frame 109 that includes an upper supporting member 107 supported by the columns 105. The constitution of the supporting frame 109 is not limited to the above configuration. For example, it is possible to use a structural configuration which is comprised of a cantilever-type structure, that is, a U-shaped one. For this structural configuration, the front side, right side, and left side of the space placed between the base member 103 and the upper supporting member 107 are open. Thus, when the food dough is rolled in the space, and when the food dough is inserted into and removed from the space, it becomes easy to handle the food dough.

The apparatus 101 is provided with a horizontally swiveling table 113 disposed in the space between the base member 103 and the upper supporting member 107. A block of food dough 111 having an arbitrary shape can be placed on the swiveling table 113. More particularly, the base member 103 is provided with actuators 115, such as ball screw mechanisms or hydraulic cylinders, for example. The actuators 115 can lower and lift an ascending and descending member 117. Further, the ascending and descending member 117 is provided with a motor M1, such as a servo motor. The swiveling table 113 is mechanically mounted on a rotatable flange 119 horizontally rotated by the motor M1. By the constitution of the apparatus, the swiveling table 113 can horizontally rotate and ascend and descend. The speeds of the rotation and descent and ascent of the swiveling table 113 can be controlled by controlling the motor M1 and the actuators for lowering and lifting the member 117 by a controlling device.

To allow the food dough 111 to be easily inserted onto and removed from the swiveling table 113, a tray 121 can be placed and positioned on the swiveling table 113, wherein the food dough 111 is disposed on the tray. Particularly, the tray 121 and the swiveling table 113 may have mating points to mate them to each other and to position the tray 121 when the tray 121 is placed on the swiveling table 113. Namely, the tray 121 and the swiveling table 113 may have a positioning mechanism for the tray 121.

For the embodiment, as the positioning mechanism, it is shown that holes 123 are disposed at the tray 121, and that pins 125 are disposed at the swiveling table 113, which pins correspond to the holes. However, since the positioning mechanism is used to determine the relative position between the tray 121 and the swiveling table 113, it is also possible for the holes 123 to be disposed at the swiveling table 113, and that pins 125 be disposed at the tray 121.

Further, the positioning mechanism can position the tray 121 relative to the swiveling table 113 so that they are not misaligned. Thus, the positioning mechanism can be comprised of a male part disposed at either the swiveling table 113 or the tray 121, and a female part disposed at the other. Namely, if magnets are used as the positioning mechanism, either the South Pole or the North Pole corresponds to the male part, and the other corresponds to the female part. Thus, various types of a positioning mechanism can be used for positioning the tray 121 on the swiveling table 113 to prevent the tray 121 from being misaligned.

A supporting bracket 127 is disposed at the bottom surface of the upper supporting member 107. A plurality of conical-shaped rolling rollers 129 are rotatably supported by the supporting bracket 127. The rolling rollers 129 are connected to motors M2, such as servomotors, disposed on the supporting bracket 127, to individually rotate them. Thus, each rolling roller 129 can be rotated by driving the motors M2. It is also possible to rotate the rolling rollers 129 by using one motor M2 and a transmission, such as a series of gears, connected to the motor M2 and the rolling rollers 129.

The rolling rollers 129 are equiangularly disposed on the horizontal circular plane. The conical-shaped rolling rollers 129 are arranged so that the generatrices of them become horizontal and are in the same plane. Namely, the central axes of the conical-shaped rolling rollers 129 are inclined against the horizontal plane. The leading edges of the conical-shaped rolling rollers 129 are gathered at one point so that it corresponds to the point on the line extending vertically from the center of the swiveling table 113. The speed of the rotation of the rolling rollers 129 is maintained at a slightly higher speed than that ("a passive speed") when they are passively rotated by the swiveling motion of the swiveling table 113. The speed ("a driven speed") of the rotation of the rolling rollers 129 equals 1.05-1.4 times the passive speed.

For the embodiment, the swiveling table 113 swivels and relatively ascends and descends, and the rolling rollers 129 are rotated by the motors M2. Consequently, the food dough 111 placed on the swiveling table 113 can be relatively pressed and gradually rolled by the rolling rollers 129. (See FIGS. 20 and 21.) FIG. 21 shows the food dough 111, which includes fillings 11A, and the tray 121, which has a projecting portion 121A on the surface of it. Since the tray 121 has the projecting portion 121A, a depressed area 111B is formed at the central portion of the food dough 111. When the swiveling table 113 swivels, ascends, and descends, and the rolling rollers rotate to roll the food dough 111, the motors M1, M2 and the actuators 115 are controlled by a controlling device 131 (see FIG. 19).

The controlling device 131 can control the driving pattern of the ascent and descent of the swiveling table 113 driven by the actuator 115, the speed of the rotation of the swiveling table 113, and the driving pattern of the rotation of the rolling rollers 129. The controlling device 131 is provided with a memory 133 for preliminarily storing the data of the several kinds of driving patterns.

For the embodiment explained in the above paragraphs, as the first example, a block of food dough 111 having a predetermined volume (weight) and having a substantially spherical shape is prepared. Next, as shown in FIG. 7, to roll the food dough 111 so that it has a predetermined thickness for a time T2, the food dough 111 is rolled while the speed 3V of the relative ascent of the swiveling table 113 toward the rolling rollers 129 is maintained at a constant value. The constant value means substantially the same speed as that used in a method for rolling the usual food dough. Then, when the distance between the rolling rollers 129 and the swiveling table 113 reaches a predetermined value so that the food dough 111 has reached a target thickness, the relative ascent of the swiveling table 113 toward the rolling rollers is stopped. As shown in FIG. 7(b), the distance between the rolling rollers 129 and the swiveling table 113 becomes inversely proportional to time. The mean radius of the food dough 111 increases according to the curve of the second order, as shown in FIG. 7(d). The area of the food dough 111 drastically increases according to the curve of the fourth order, as shown in FIG. 7(c).

For the second example, a block of food dough 111 having the same volume (weight) as that of the first example and having a substantially spherical shape is prepared. Next, as shown in FIG. 8, the speed 2V of the relative ascent of the swiveling table 113 toward the rolling rollers 129 is set to be ⅔ of the speed 3V of the first example. Thus, it takes time T3 to roll the food dough 111, which is 1.5 times T2 of the first example. FIGS. 8(b), (c), and (d) show the data of the second example. For the second example, as shown in FIG. 8(c), the area of the food dough 111 drastically increases according to the curve of the fourth order.

When the food dough 111 is rolled, if the area of the food dough 111 drastically increases as explained above, excessive stresses may be caused in the food dough. Consequently, the food dough 111 may be damaged by the excessive stresses.

To solve this problem, the following step (the third example) can be employed for rolling the food dough 111. Namely, a block of food dough 111 having the same volume as that of the first example and having a substantially spherical shape is prepared. As shown in FIG. 9(a), the food dough 111 is rolled at the speed 3V (at the higher speed) of the relative ascent of the swiveling table 113 during time 0 to time T1. Then, during time T1 to T3, the speed of the relative ascent of the swiveling table 113 becomes inversely proportional to time. When the distance between the rolling rollers 129 and the swiveling table 113 reaches a predetermined value so that the food dough 111 has reached a target thickness, the relative ascent of the rolling rollers 23 is stopped.

For the third example, as shown in FIG. 9(c), the degree of the increase of the area of the food dough 111 can be reduced at the end of the rolling step.

Further, as shown in FIG. 10(a), which shows a fourth example, the food dough 111 is rolled at the speed 3V of the relative ascent of the swiveling table 113 during time 0 to time T1. Then, during time T1 to T3, the speed of the relative ascent of the swiveling table 113 decreases in a geometrical series. When the distance between the rolling rollers 129 and the swiveling table 113 reaches a predetermined value so that the food dough 111 has a target thickness, the relative ascent of the swiveling table 113 is stopped.

For the fourth example, as shown in FIG. 10(c), the degree of the increase of the area of the food dough 111 can be reduced at the end of the rolling step.

Further, as shown in FIG. 11, which shows a fifth example, it is also possible to reduce the degree of the increase of the area of the food dough 111 at the end of the rolling step by stepwise decreasing the speed of the relative ascent of the swiveling table 113.

Namely, when the food dough 111 is rolled by relatively lifting the swiveling table 113, which the food dough 111 is placed on, toward the rolling rollers 129, it is preferable to reduce the speed of the relative ascent of the swiveling table 113 toward the rolling rollers 129 at the end of the rolling step, even if the speed at the initial rolling step is high.

The controlling device 131 for controlling the apparatus 101 for rolling the food dough 111 is provided with a computer and a memory 133. The memory 133 preliminarily stores the driving patterns of the ascent and descent of the swiveling table 113 shown in FIGS. 9-11. The controlling device 131 is further comprised of a calculating means 135 and a controlling means 137 and a controlling means 139 for controlling the speed of the rotation of the motors M1 and M2, respectively. Further, the controlling means 137 and 139 are respectively connected to motor drivers 141 and 143 for controlling the motors M1 and M2.

The controlling device 131 is further comprised of an input means 145 having switches for activating the apparatus and for selecting the driving pattern based on the properties of food dough 111, and a driving pattern controlling means 147 for controlling the relative ascent and descent of the swiveling table 113 based on the selected driving pattern.

For the embodiment explained in the above paragraphs, after the food dough 111 placed on the tray 121 is inserted onto the swiveling table 113, the apparatus 101 for rolling the food dough is activated by switching on the switch disposed at the input means 145. At the initial rolling step, the actuator 115 for lowering and lifting the ascending and descending member 117 is driven, and then the swiveling table 113 can be relatively lifted. At that time, the swiveling table 113 is maintained at a static condition or rotated at a predetermined low speed. Namely, the swiveling table 113 is rotated at lower speed so that the food dough 111 placed on the swiveling table 113 is not caused to shift to the side because of the centrifugal force generated by the rotation of the swiveling table 113. The rolling rollers 129 are also maintained at a static condition or rotated at a predetermined low speed according to the motion of the swiveling table 113.

When the swiveling table 113 is lifted, and the food dough 111 starts to contact the rolling rollers 129, the swiveling table 113 begins to rotate at a predetermined speed. At that time, the speed of the rotation of the rolling rollers 129 is calculated by the calculating means 135 so that the rolling rollers 129 rotate at a speed 1.05-1.4 times higher than the speed when the rolling rollers 129 are passively rotated by the swiveling motion of the swiveling table 113. Then, the speed of the rotation of the rolling rollers 129 is controlled by the controlling means 139. The speed of the ascent of the swiveling table 113 is controlled based on the data of the driving pattern. The data is preliminarily selected from the memory 133 for storing the data of the driving patterns by inputting a command to select the data through the input means 145.

Then, based on the following method, whether the food dough 111 contacts the rolling rollers 129 is detected. Namely, an optical sensor 149 is placed so that a ray from it passes through, and just below, the generatrices M of the conical-shaped rolling rollers 129, and then, when the ray is interrupted, it is assumed that the food dough 111 has contacted the rolling rollers 129. Alternatively, if the speed of the ascent of the swiveling table 113 is constant, and if the thickness of the tray 121 and of the food dough 111 is constant, then when the elapsed time from the time for starting to lift the swiveling table 113 reaches a predetermined value, it can be assumed that the food dough 111 is in contact with the rolling rollers 129.

The following method can also be used for detecting whether the food dough 111 contacts the rolling rollers 129. Namely, the apparatus is comprised of a sensor, such as a linear sensor, to sense the vertical position of the swiveling table 113. It is defined as the original point on the swiveling table 113 where the rolling rollers 129 contact the tray 121 on the swiveling table 113. When the swiveling table 113 is lifted from the lower position, the distance between the swiveling table 113 and the original point is detected by the sensor. Then, when the distance becomes equal to the thickness of the food dough 111 on the tray 121, it can be assumed that the food dough 111 is in contact with the rolling rollers 129.

For this embodiment, as previously explained, the swiveling table 113 can swivel and relatively ascend toward the rolling rollers 129, and the rolling rollers 129 are rotated by the motors M2. Then, the food dough 111 that is placed on the swiveling table 113 is rolled to form disk-shaped food dough. At that time, the rolling rollers 129 are rotated by the motors M2 at a speed 1.05-1.4 times higher than the speed when the rolling rollers 129 are passively rotated by the swiveling motion of the swiveling table 113.

Consequently, the food dough 111 can be rolled without causing any slipping between the food dough 111 and the surface of the rolling rollers 129. Further, since the rolling rollers 129 are rotated at a slightly higher speed than the passive speed, if ribbed-like embossments are caused to form at the front of the rolling rollers 129, the ribbed-like embossments are drawn into the gap between the rolling rollers 129 and the surface of the tray 121. Thus, it is possible to effectively solve the problem of the ribbed-like embossments.

Further, since the peripheral speed of the base end of the conical-shaped rolling rollers 129 is higher than that of their leading edges, the food dough 111 tends to be drawn toward the base end of the conical-shaped rolling rollers 129 from the leading edges of them (in the radial direction). Thus, the food dough 111 can be formed into a proper shape, such as a disk-like shape, by the synergetic effect of pressing it by the rolling rollers 129 and by rotating the rolling rollers 129 at a higher speed.

Thus, in comparison with when the food dough 111 is rolled by the rolling rollers 129 rotating at the passive speed, since by this invention it can be effectively rolled, it is possible to improve the productivity.

Further, it is possible to set the speed of the rotation of the rolling rollers below 1.05 times higher than the passive speed. However, for this condition, the effect for drawing the food dough 111 into the gap between the rolling rollers 129 and the surface of the tray 121 is not enough. Thus, since it takes a long time to roll the food dough 111, it is difficult to improve the productivity. Namely, it is preferable to set the speed of the rotation of the rolling rollers to be more than 1.05 times higher than the passive speed.

Further, it is possible to set the speed of the rotation of the rolling rollers at more than 1.4 times higher than the passive speed. However, for this condition, at the position of the front of the rolling rollers 129 the effect for drawing the food dough 111 into the gap between the rolling rollers 129 and the surface of the tray 121 becomes excessive. Thus, since stresses tend to remain in the food dough 111, when the rolling rollers 129 are removed from the food dough 111 after rolling it, it tends to shrink because of the stresses in it. Namely, that is not preferable.

As explained in the above paragraph, it is preferable to set the scope of the speed of the rotation of the rolling rollers 129 between 1.05 and 1.4 times higher than the passive speed. It is preferable to select the proper speed of the rotation of the rolling rollers 129 based on the properties of the food dough 111.

Many types of food dough 111, such as food dough having a round shape, food dough left standing for several tens of minutes, fermented food dough, and food dough preliminarily rolled so that it has a predetermined thickness, can be rolled by this method.

As previously explained, when the food dough 111 is rolled, and then, when the step for rolling it nears the later phase, it is preferable that the rotation of the rolling rollers 129 be controlled so as to maintain it at a lower speed. For example, first, the driving pattern which controls the step for rolling the food dough 111 so as to complete it by time T3 is selected from the various kinds of driving patterns preliminarily stored in the memory 133. Next, in accordance with the driving pattern, the actuators 115 for lowering and lifting the ascending and descending member 117 are controlled by the driving pattern controlling means 147. When the time T elapses from the starting point of the step to the middle point between T2 and T3 of it (T≈[T2+T3]/2), the driving pattern controlling means 147 sends a signal, to denote that the time T has elapsed from the starting point of the step, to the controlling means 139, for controlling the speed of the rotation of the motors M2. Then, the motors M2 are controlled so as to be rotated at a lower speed by the controlling means 139 through the motor driver 143 based on the data of the driving pattern for controlling the motors M2 at a lower speed stored in a memory (not shown).

Thus, at the end of the step for rolling the food dough 111, it can be prevented from being rolled too much and from being damaged near the center of it.

Alternatively, as the method for detecting the step for rolling food dough 111 nears the later phase, the following method can also be used. When a sensing means, such as a linear sensor, to sense the vertical position of the swiveling table 113, detects that it has reached the predetermined position, it can be assumed that the step near the later phase for rolling the food dough 111 has been reached.

For this embodiment, since the food dough 111 placed on the tray 121 is inserted onto the swiveling table 113, and then the food dough 111 is rolled, it is possible to easily place the food dough 111 on the swiveling table 113. Then, after rolling the food dough 111, the tray 121 can be removed from the swiveling table 113 together with the food dough 111 on it. Thus, it is possible to easily take thin food dough 111 out without causing it to be damaged.

For the embodiment explained in the above paragraphs, when the step for rolling food dough 111 near the later phase has been reached, the rotation of the rolling rollers 129 is controlled so as to maintain a lower speed. However, alternatively, as a method for releasing the stress caused in the food dough 111 during the rolling step, the following method can be used. Namely, it is effective to release the stress caused in the food dough 111 by stopping the rotation of the swiveling table 113 and the rolling rollers 129, and then reversely rotating them.

At the later step for rolling the food dough 111, the following method can be used for reversely rotating the swiveling table 113 and the rolling rollers 129. Namely, first, the swiveling table 113 can be rotated and relatively lifted, and then the food dough 111 can be rolled by the normal rotation of the rolling rollers 129. When the end of the step is detected by the method for detecting that the step for rolling food dough 111 nears the end of the step, the rotation of the swiveling table 113 and the rolling rollers 129 is stopped, and then the swiveling table 113 is lowered so as to separate the food dough 111 from the rolling rollers 129.

Then, the swiveling table 113 and the rolling rollers 129 are reversely rotated, based on the driving pattern, at a low speed stored in a memory (not shown). The swiveling table 113 is relatively lifted at the lower speed of the end of the step, and then the food dough 111 is pressed and rolled for a short time by the rolling rollers 129 reversely rotating at a low speed.

At that time, the speed of the reverse rotation of the rolling rollers 129 substantially equals that of the normal rotation of them at the end of the step. The difference in these steps is just the direction of the rotation. When the directions of the rotation of the swiveling table 113 and the rolling rollers 129 are changed at the end of the step, since the direction of the twist caused in the food dough 111 during rolling can be changed, it is possible to release the stress caused in the food dough 111.

Next, another embodiment according to the third aspect of an apparatus for rolling food dough of the present invention is explained. The elements of the embodiment, which are the same as those of the former embodiment, are denoted with the same numbers, and the overlapping explanation is omitted.

The purpose of the apparatus for rolling food dough according to this embodiment is to simplify and downsize it. A speed-decreasing device 153 is integrally attached to a motor M1 disposed at a supporting frame 109 placed on a base structure 151. A rotating shaft 155 is vertically and rotatably arranged on the speed-decreasing device 153. A swiveling table 157 is connected to the rotating shaft 155 so that it can vertically ascend and descend. Namely, the swiveling table 157 can rotate together with the rotating shaft 155 through a key and relatively ascend away from and descend toward the rotating shaft 155.

A bellcrank lever 163 is disposed at a supporting bracket 159 disposed on the supporting frame 109 through a supporting axis 161 so that it can vertically swing. A shifting pin is disposed at the proximal end of the bellcrank lever 163. The shifting pin is rotatably fitted to a circumferential groove disposed at the boss of the swiveling table 157. Thus, when the distal end of the bellcrank lever 163 is gripped and vertically lifted and lowered, the swiveling table 157 ascends and descends. A tray 165 having food dough 111 on it can be inserted onto or removed from the swiveling table 157.

For this embodiment, motors M1 and M2 can be driven by switching on on/off switch 167 disposed at the supporting frame 109. The motors M2 rotate so that the rolling rollers 129 rotate at a speed of 1.05-1.4 times higher than the speed when the rolling rollers 129 contact the swiveling table 157, and are passively rotated by the swiveling motion of the swiveling table 157. To drive the motors M2 so that the rolling rollers 129 rotate at a speed of 1.05-1.4 times higher than their passive speed, it is preferable that a control panel be provided with a volume dial for controlling the speed of the motors M2.

For the apparatus explained in the above paragraphs, after inserting the tray 165 having the food dough 111 on it onto the swiveling table 157, it can be relatively lifted and lowered by moving the bellcrank lever 163 by one hand. Further, it is possible to manually adjust the timing for starting to rotate the swiveling table 157 and the rolling rollers 129 through the motors M1 and M2 by switching the on/off switch 167 by the other hand.

For this embodiment, since the starting point of the rotations of the swiveling table 157 and the rolling rollers 129 can be manually adjusted during a visual observation of the vertical position of the swiveling table 157 it is possible to easily roll the food dough 111 so that it has a target thickness.

At that time, since the speed of the rolling rollers 129 is slightly higher than the passive speed of them, it is possible to have the same effects as those of the former embodiment. Further, since the tray 165 can be removed from the swiveling table 157 without preliminarily taking the food dough 111 off the tray 165, it is possible to easily handle the food dough 111 even if it is thinly rolled. Further, in this manual operation, since the apparatus must be handled by both hands, there is no danger, such as getting one's hand stuck between the tray 165 and the rolling rollers 129. Thus, the safety of the apparatus is improved.

For the embodiment explained in the above paragraphs, at the end of the step for rolling the food dough 111, the rotation of the rolling rollers 129 is controlled based on the following method, so as to maintain a lower speed. Namely, by visual observation, the thickness of the food dough 111 is confirmed, and when the thickness of the food dough 111 reaches a predetermined value, the speed of the rolling rollers 129 is controlled so as to be rotated at a lower speed, by adjusting the volume dial disposed at the control panel.

Instead of or in addition to the on/off switch 167, selecting switches can be used for controlling the motors M1 and M2. The selecting switches can control the directions and the rotations of the motors M1, M2 by clockwise or counterclockwise rotating the selecting switches from the neutral position. When the selecting switches are no longer manually controlled, they return to the neutral position by returning springs disposed in them, and the rotations of the motors M1 and M2 stop.

For this embodiment, at the end of the step for rolling the food dough 111, it is possible to stop the rotations of the swiveling table 157 and the rolling rollers 129, to allow the food dough 111 to separate from the rolling rollers 129, to reversely rotate the rotations of the swiveling table 157 and the rolling rollers 129 at a lower speed, and to roll the food dough again. The swiveling table 157 can be lifted and lowered by the bellcrank lever 163, when it is stationary.

The invention claimed is:

1. An apparatus for rolling a block of food dough placed on a table by means of conical-shaped rolling rollers swiveling and rotating above the table,
   a first driving means for swiveling the rolling rollers,
   a second driving means for rotating the rolling rollers, and
   a control means for controlling the second driving means so that the speed of the rolling rollers is higher than the speed of the rolling rollers when the rolling rollers are passively rotated by the swiveling motion of the rolling rollers.

2. An apparatus for rolling a block of food dough placed on a table by means of conical-shaped rolling rollers swiveling and rotating above the table,
   a cradle that can relatively ascend away from and descend toward the table,
   conical-shaped rolling rollers disposed at the cradle, wherein the rolling rollers can swivel and rotate, and motors to rotate the rolling rollers.

3. The apparatus according to claim 2, wherein the number of the conical-shaped rolling rollers and the motors for rotating the rolling rollers are plural, and wherein the motors are arranged so that the motors correspond to the rolling rollers.

4. The apparatus according to claim 3, further comprising,
   a motor for swiveling the rolling rollers, and
   a controlling means to control the rotation of the motor for swiveling the rolling rollers so that the speed of the rotation of the rolling rollers can be maintained at a higher speed than that of the rolling rollers when the rolling rollers are passively rotated by the swiveling motion of the rolling rollers.

5. The apparatus according to claim 4, further comprising,
   an actuator for relatively lifting the rolling rollers away from the table and lowering the rolling rollers toward the table, and
   a controlling means to control the driving pattern of the actuator.

6. The apparatus according to claim 5,
   wherein the table is comprised of a conveying means to convey the food dough from the position of the apparatus for rolling the food dough to another position of the apparatus for removing the food dough.

7. The apparatus according to claim 2, wherein the number of the conical-shaped rolling rollers is plural, wherein the number of the motors for rotating the rolling rollers is less than the number of rolling rollers, and wherein the motors are connected to the rolling rollers through a transmission.

8. The apparatus according to claim 7, further comprising,
   a motor for swiveling the rolling rollers, and
   a controlling means to control the rotation of the motor for swiveling the rolling rollers so that the speed of the rotation of the rolling rollers can be maintained at a higher speed than that of the rolling rollers when the rolling rollers are passively rotated by the swiveling motion of the rolling rollers.

9. The apparatus according to claim 8, further comprising,
   an actuator for relatively lifting the rolling rollers away from the table and lowering the rolling rollers toward the table, and
   a controlling means to control the driving pattern of the actuator.

10. The apparatus according to claim 9,
    wherein the table is comprised of a conveying means to convey the food dough from the position of the apparatus for rolling the food dough to another position of the apparatus for removing the food dough.

11. The apparatus according to claim 2, further comprising,
    a motor for swiveling the rolling rollers, and
    a controlling means to control the rotation of the motor for swiveling the rolling rollers so that the speed of the rotation of the rolling rollers can be maintained at a higher speed than that of the rolling rollers when the rolling rollers are passively rotated by the swiveling motion of the rolling rollers.

12. The apparatus according to claim 11, further comprising,
    an actuator for relatively lifting the rolling rollers away from the table and lowering the rolling rollers toward the table, and
    a controlling means to control the driving pattern of the actuator.

13. The apparatus according to claim 12,
    wherein the table is comprised of a conveying means to convey the food dough from the position of the apparatus for rolling the food dough to another position of the apparatus for removing the food dough.

14. The apparatus according to claim 2, further comprising,
an actuator for relatively lifting the rolling rollers away from the table and lowering the rolling rollers toward the table, and
a controlling means to control the driving pattern of the actuator.

15. The apparatus according to claim 14,
wherein the table is comprised of a conveying means to convey the food dough from the position of the apparatus for rolling the food dough to another position of the apparatus for removing the food dough.

16. The apparatus according to claim 2,
wherein the table is comprised of a conveying means to convey the food dough from the position of the apparatus for rolling the food dough to another position of the apparatus for removing the food dough.

17. An apparatus for rolling a block of food dough placed on a table so that the food dough has a disk-shaped form, comprising
conical-shaped rolling rollers disposed above the table, wherein the rolling rollers can swivel and rotate,
pinion gears integrated with the rolling rollers, and
a ring-shaped guide gear engaging the pinion gears,
wherein at least either the table or the rolling rollers can ascend and descend.

18. The apparatus according to claim 17, further comprising,
a motor for swiveling the rolling rollers,
wherein the number of teeth of the pinion gears and the ring-shaped guide gear is set so that the speed of the rotation of the rolling rollers, which rotation is caused by an engagement between the pinion gears and the guide gear, can be maintained at a higher speed than that of the rolling rollers when the rolling rollers are passively rotated by the swiveling motion of the rolling rollers.

19. The apparatus according to claim 17, further comprising
an actuator for relatively lifting the rolling rollers away from the table and lowering the rolling rollers toward the table, and
a controlling means to control a driving pattern of the actuator.

20. The apparatus according to claim 18, further comprising
an actuator for relatively lifting the rolling rollers away from the table and lowering the rolling rollers toward the table, and
a controlling means to control a driving pattern of the actuator.

21. An apparatus for rolling a block of food dough to form disk-shaped food dough, comprising:
a table rotated by a motor, wherein the food dough can be placed on the table, and
rolling rollers disposed above the table, wherein the rolling rollers are rotated by another motor,
wherein at least either the table or the rolling rollers can ascend and descend.

22. The apparatus according to claim 21, further comprising:
an actuator for relatively lifting the rolling rollers away from the table and lowering the rolling rollers toward the table, and
a controlling means to control a driving pattern of the actuator.

23. The apparatus according to claim 21, further comprising:
a positioning device to position a tray for placing the food dough on it.

24. The apparatus according to claim 23, further comprising:
a controller to control the motors for driving the table and the rolling rollers,
wherein the controller is comprised of a memory which stores the data of a profile chart for controlling the motors so that the speed of the rolling rollers decreases at the end of the driving step.

25. The apparatus according to claim 23, further comprising:
an operating means to change the direction of the rotation of the table and the rolling rollers.

26. The apparatus according to claim 21, further comprising:
a controller to control the motors for driving the table and the rolling rollers,
wherein the controller is comprised of a memory which stores the data of a profile chart for controlling the motors so that the speed of the rolling rollers decreases at the end of the driving step.

27. The apparatus according to claim 21, further comprising:
an operating means to change the direction of the rotation of the table and the rolling rollers.

* * * * *